United States Patent [19]
Fujii

[11] Patent Number: 5,570,344
[45] Date of Patent: Oct. 29, 1996

[54] SYNCHRONOUS DIGITAL HIERARCHY TRANSMISSION DEVICE AND METHOD FOR EXCHANGING SYNCHRONOUS DIGITAL HIERARCHY TRANSMISSION DEVICE UNITS

[75] Inventor: Yasuo Fujii, Kawasaki, Japan

[73] Assignee: Fujitsu Limited, Kanagawa, Japan

[21] Appl. No.: 298,048

[22] Filed: Aug. 30, 1994

[30] Foreign Application Priority Data

Mar. 1, 1994 [JP] Japan .................................. 6-030746

[51] Int. Cl.⁶ .................................................. H04L 1/22
[52] U.S. Cl. .............................. 370/16; 370/68; 370/68.1; 370/55; 340/827
[58] Field of Search .............................. 370/16, 16.1, 14, 370/15, 55, 58.1, 58.2; 371/8.2, 8.3; 340/825.01–.03, 826–827

[56] References Cited

U.S. PATENT DOCUMENTS

| | | | |
|---|---|---|---|
| 5,216,666 | 6/1993 | Stalick | 370/16.1 |
| 5,265,096 | 11/1993 | Parruck | 370/110.1 |
| 5,343,464 | 7/1994 | Iino et al. | 370/16 |
| 5,390,164 | 2/1995 | Kremer | 370/16.1 |
| 5,394,389 | 2/1995 | Kremer | 370/16.1 |
| 5,406,401 | 4/1995 | Kremer | 370/16.1 |
| 5,406,549 | 4/1995 | Kremer | 370/16.1 |
| 5,459,715 | 10/1995 | Furuta et al. | 370/16 |

FOREIGN PATENT DOCUMENTS

| | | | |
|---|---|---|---|
| 0543327 | 5/1993 | European Pat. Off. | |
| 0215129 | 7/1989 | Japan | 370/16 |

*Primary Examiner*—Douglas W. Olms
*Assistant Examiner*—Seema S. Rao

[57] ABSTRACT

In an SDH transmitting/receiving device having unitized redundantly configured transmitting/receiving sections (STM4W, STM4P), a multiplexing protection processing section (MSP), a redundantly configured time-slot exchange section (TSA), a unit switching processing section (UNITSW), and a channel section (D1CH), in addition to registers being provided in the multiplexing protection processing section and in the unit switching processing section, a signal line is provided between the multiplexing protection processing section and the unit switching processing section, whereby when performing an upgrade to a multiple-shelf configuration high transfer speed SDH transmitting/receiving device, a unit switching request is made to the multiplexing protection processing section and unit switching information is set into a register, and by making a mandatory switching request in the process of exchanging units, the unit switching information is transferred via the signal line to the unit switching processing section and the units are switched.

4 Claims, 19 Drawing Sheets

Fig. 2

| | | | | | | | | |
|---|---|---|---|---|---|---|---|---|
| A1 | A1 | A1 | A2 | A2 | A2 | C1 | | |
| B1 | | | E1 | | | F1 | | |
| D1 | | | D2 | | | D3 | | |
| | | | (AU POINTER) | | | | | |
| B2 | B2 | B2 | K1 | | | K2 | | |
| D4 | | | D5 | | | D6 | | |
| D7 | | | D8 | | | D9 | | |
| D10 | | | D11 | | | D12 | | |
| Z1 | Z1 | Z1 | Z2 | Z2 | Z2 | E2 | | |

← 9 COLUMNS →

9 ROWS

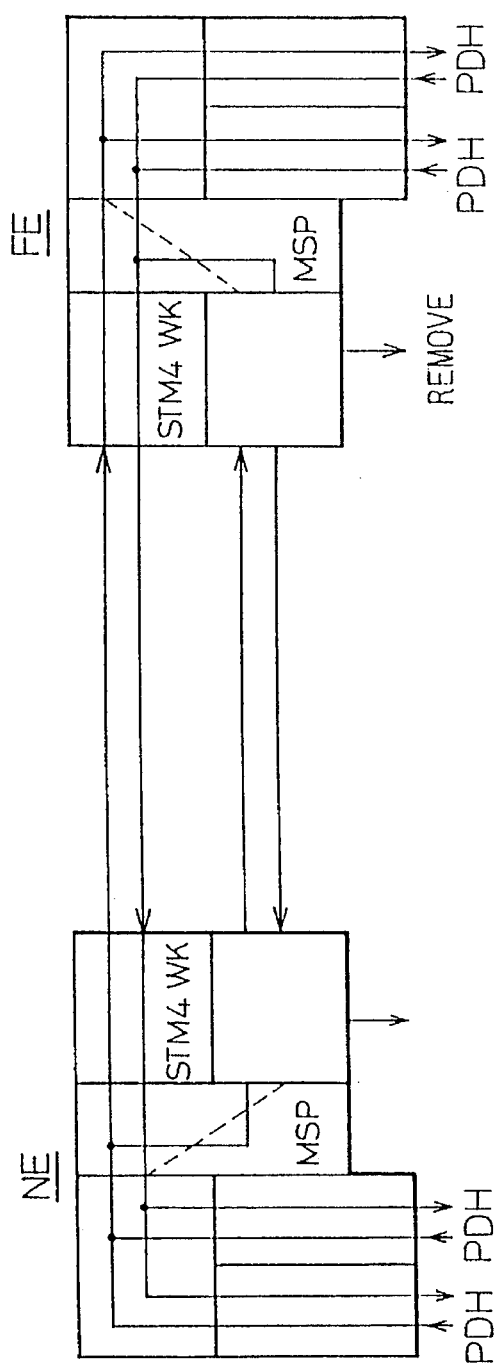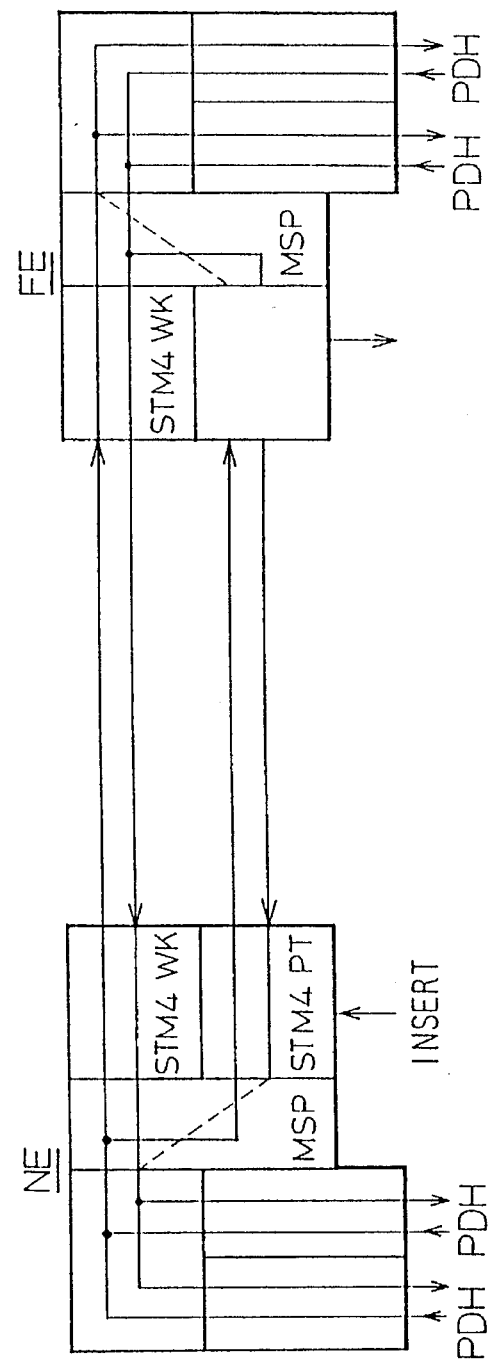
Fig.8(A)
Fig.8(B)

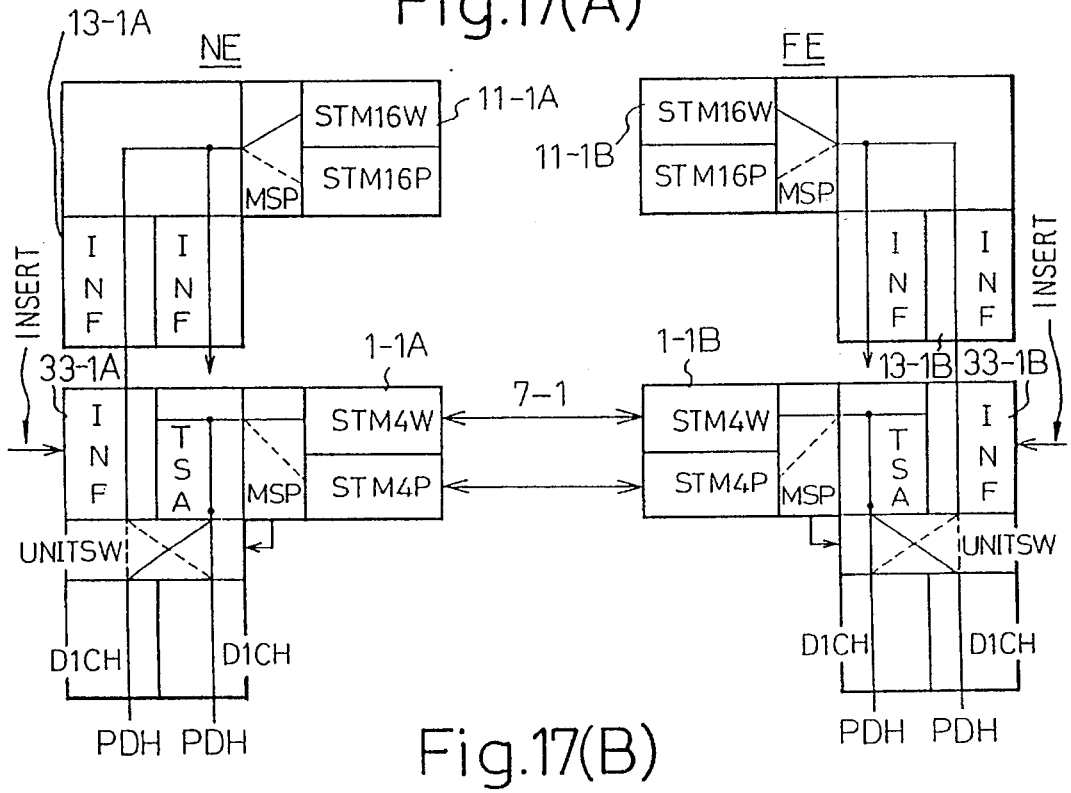
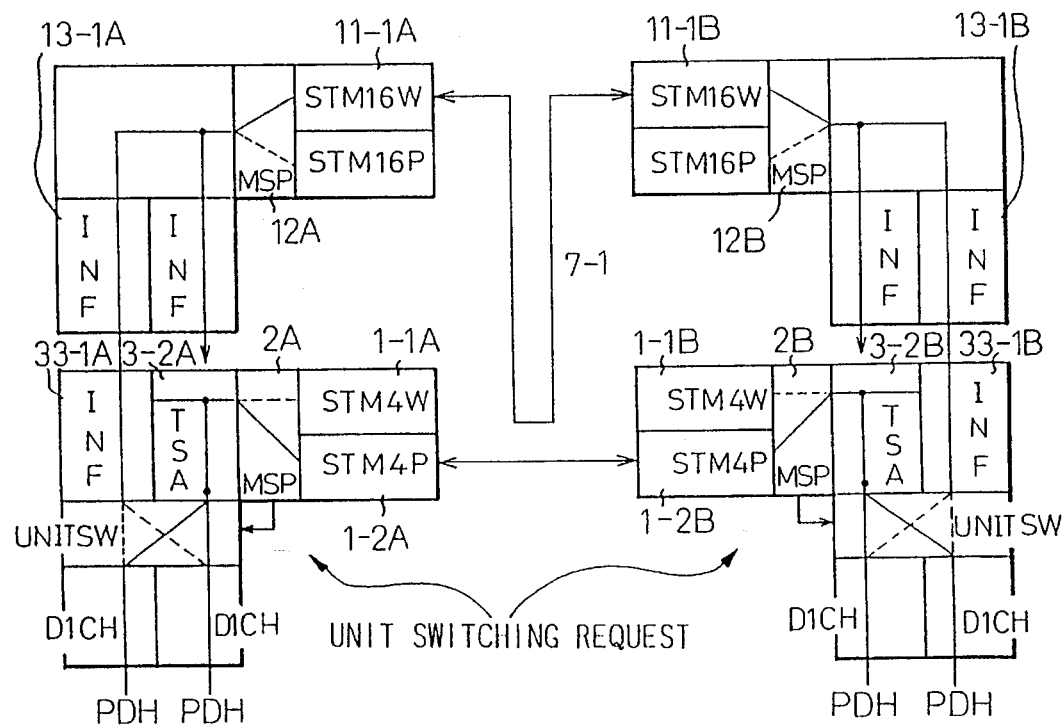

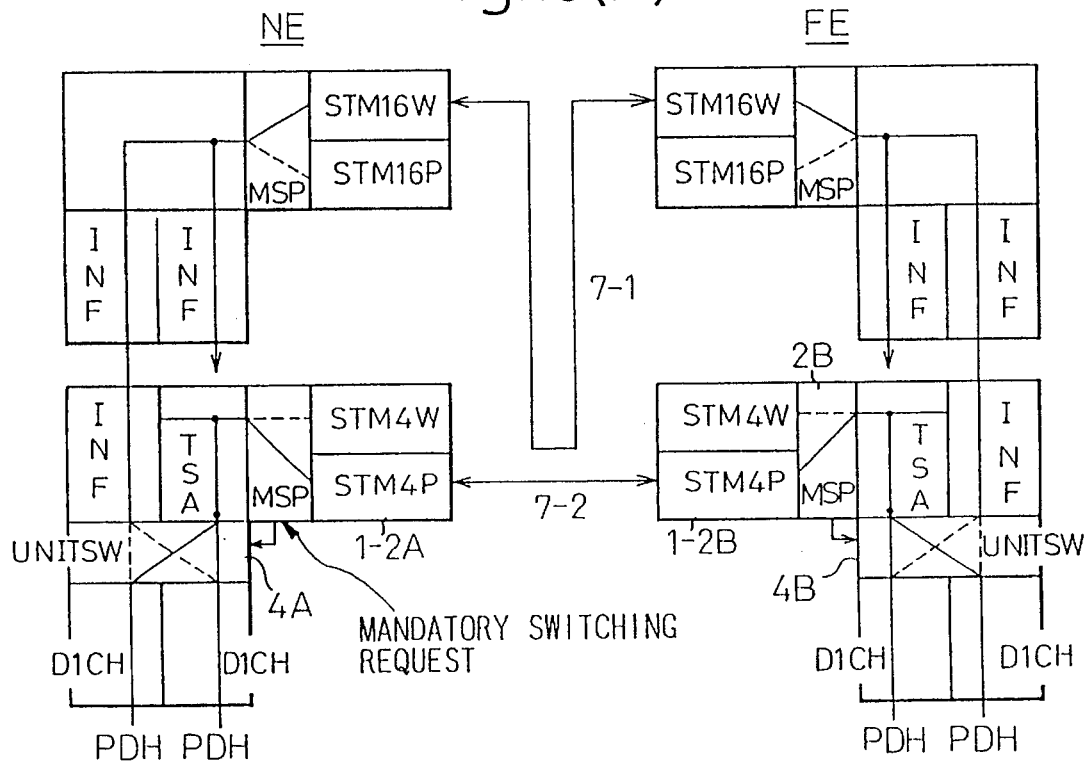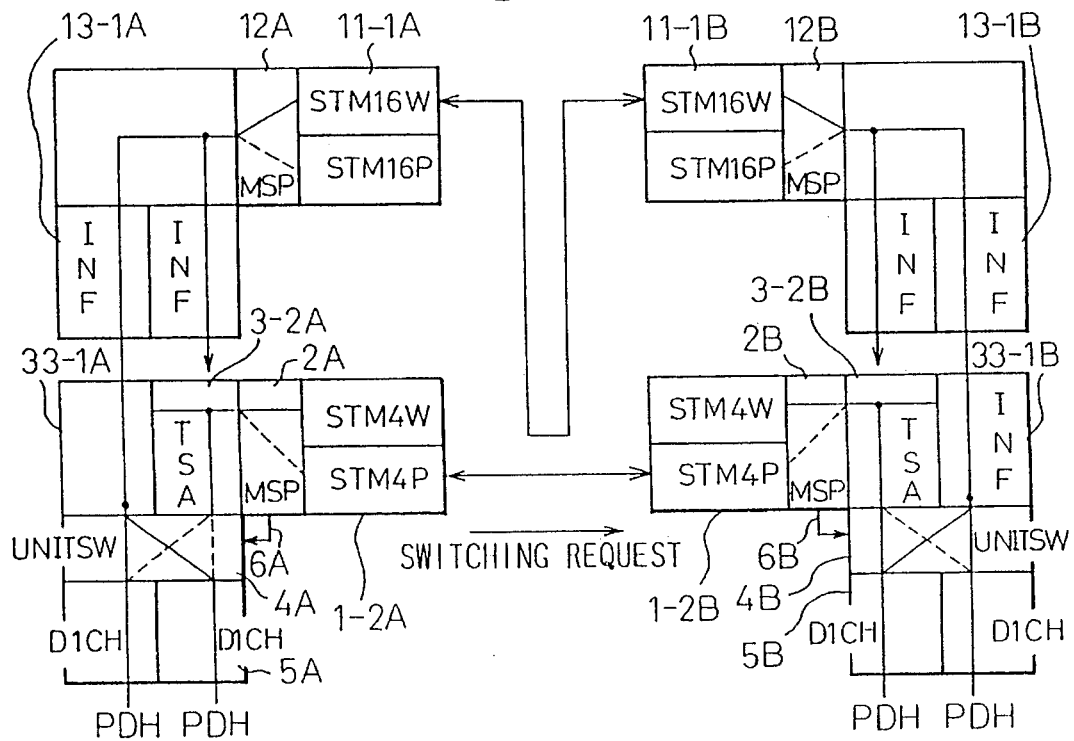

SYNCHRONOUS DIGITAL HIERARCHY TRANSMISSION DEVICE AND METHOD FOR EXCHANGING SYNCHRONOUS DIGITAL HIERARCHY TRANSMISSION DEVICE UNITS

BACKGROUND OF THE INVENTION

1. Field of the Invention

The present invention is related to an SDH device and a method of exchanging units while in service to achieve upgrading.

2. Description of the Related Art

SDH (synchronous digital hierarchy) transmission devices are arranged in STM-1 (synchronous transfer module level one) multiplexing units of 155.52 Mbps, with STM-N integral multiples of this multiplexing unit being standardized as STM-1, STM-4, and STM-16, where N is 1, 4, and 16, respectively. The STM-0, having a bit rate of 51.84 Mbps, which is ⅓ that of the STM-1 corresponds to the OC-1 used in SONET (synchronous optical network). These SDH transmission devices are implemented in units with a redundant configuration, and it is desirable to be able to perform upgrades with the units remaining in service.

However, when upgrading either the above-described SDH transmission device which had been upgraded from STM-1 to STM-4 or an SDH transmission device that was made from the start for STM-4 use (600 Mbps) to use for high-speed transmission STM-16 (2.4 Gbps), it is possible for the maintenance personnel at the NE (near-end) side and FE (far-end) side to contact each other to enable simultaneous removal of respective time-slot switching sections, thereby placing a unit switching processing section into operation. With this method, there could be a skew in the timing of the operations performed by the maintenance personnel, and it is impossible to achieve switching in the 50 ms required for in-service upgrades.

SUMMARY OF THE INVENTION

The present invention has as an object the use of a simple configuration to achieve synchronization of unit switching, thereby enabling in-service upgrades.

According to the present invention, there is provided an SDH transmitting/receiving device comprising at least a redundantly configured transmitting/receiving section, a multiplexing protection processing section, a redundantly configured time-slot exchange section, a unit switching processing section, and a channel section, wherein the elements are configured as units, a register into which is set unit switching information is provided in each of the multiplexing protection processing section and the unit switching processing section, and a signal line which transfers said unit switching information from the multiplexing protection processing section to the unit switching processing section is provided.

Further, according to the present invention, there is provided a method of exchanging units for the purpose of upgrading an SDH transmission device, the SDH transmission device comprising at least a redundantly configured transmitting/receiving section, a multiplexing protection processing section, a redundantly configured time-slot exchange section, a unit switching processing section, and a channel section, wherein the elements are configured as units, and a register into which is set unit switching information is provided in each of the multiplexing protection processing section and the unit switching processing section, and a signal line which transfers the unit switching information from the multiplexing protection processing section to the unit switching processing section is provided. The method includes the step whereby when making a unit switching request of the multiplexing protection processing section of the near-end and far-end SDH transmission devices, and by means of this unit switching request setting the unit switching information into the multiplexing protection processing section and exchanging units, in addition to either the near-end SDH transmission device or the far-end SDH transmission device sending a mandatory switching request to the other side, the mandatory switching request causes the unit switching information to be transferred from the multiplexing protection processing section via the signal line to the unit switching processing section, and the units are then exchanged.

In the method of exchanging units for the purpose of upgrading an SDH transmission device, the purpose of the method being to upgrade from a single-shelf SDH transmission device to a multiple-shelf high transfer speed SDH transmission device, after changing the connection of an optical transmission path between in-service low transfer speed SDH transmission devices to high transfer speed SDH transmission devices, unit exchange is performed.

Further, in the method of exchanging units for the purpose of upgrading an SDH transmission device, the purpose of the method being to upgrade from a single-shelf SDH transmission device to a multiple-shelf high transfer speed SDH transmission device, before exchanging a remaining time-slot exchange section unit of the low transfer speed SDH transmission device with the interface section unit, a unit switching request is sent to the multiplexing protection processing section.

BRIEF DESCRIPTION OF THE DRAWINGS

The present invention will be more clearly understood from the description as set forth below with reference to the accompanying drawings:

FIG. 2 explains the STM-1 section overhead.

FIG. 8(A) explains the upgrade sequence (7) from STM-1 to STM-4.

FIG. 8(B) explains the upgrade sequence (8) from STM-1 to STM-4.

FIG. 17(A) explains the upgrade sequence (3) according to the method of exchanging units of an embodiment of the present Invention.

FIG. 17(B) explains the upgrade sequence (4) according to the method of exchanging units of an embodiment of the present invention.

FIG. 18(A) explains the upgrade sequence (5) according to the method of exchanging units of an embodiment of the present invention.

FIG. 18(B) explains the upgrade sequence (6) according to the method of exchanging units of an embodiment of the present invention.

DESCRIPTION OF THE PREFERRED EMBODIMENTS

Before describing the preferred embodiments according to the present invention, examples of the related art are provided with reference to FIGS. 1 to 11.

Figure 1:
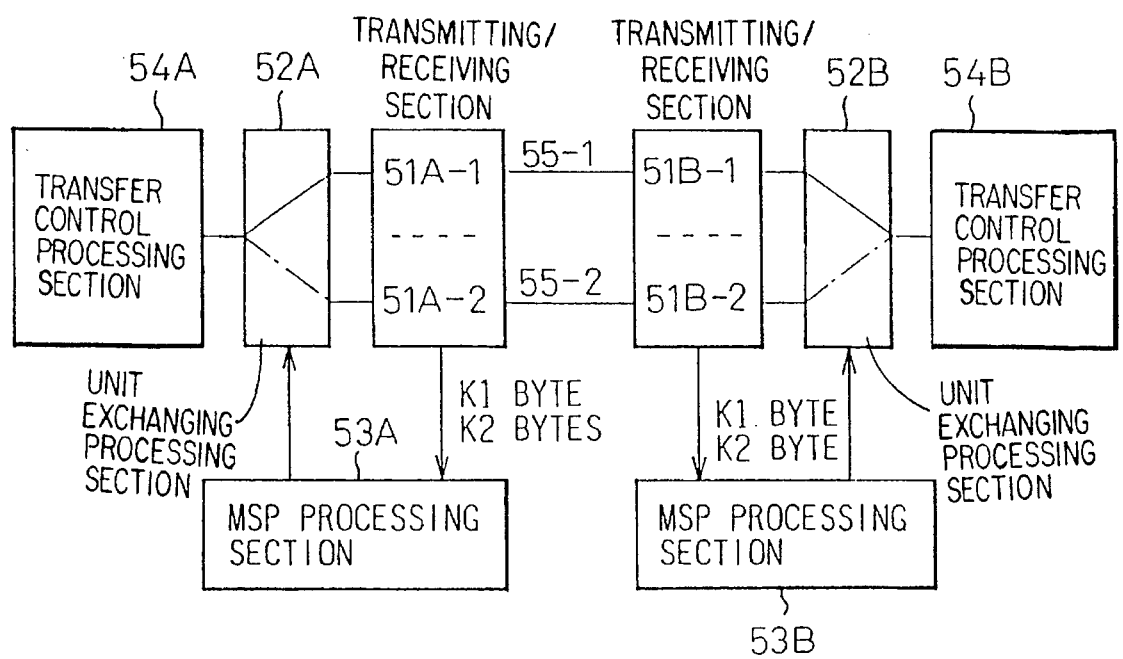
FIG. 1 explains the SDH transmission device.

FIG. 1 is a drawing that explains the SDH transmission device, with 51A-1 and 51B-1 being the transmitting/receiving sections, 51A-2 and 51B-2 being the spare transmitting/receiving sections, 52A and 52B being the unit exchanging processing sections, 53A and 53B being the MSP (multiplex section protection) processing sections, 54A and 54B being the transfer control sections, and 55-1 and 55-2 being the optical transmission paths.

The transmitting/receiving sections 51A-1, 51A-2, 51B-1, and 51B-2 each have an electro-optical conversion section and transmit and receive optical signals. For example, when transmitting and receiving in the STM-1 format, the section overhead, as shown in FIG. 2, is 9 rows by 9 columns, with A1 and A2 being the frame synchronizing bytes, C1 being the STM-1 identification byte, B1 being the relay section error monitoring byte (BIP-8), E1 being the relay section order wire byte, F1 being the relay section fault identification byte, D1 to D3 being the relay section data communications bytes, B2 being the section error monitoring bytes, K1 and K2 being the APS (automatic protection switch) bytes, D4 to D12 being the multiplexing section data communications bytes, Z1 and Z2 being spare bytes, and E2 being the multiplexing section order wire byte. The AU pointer indicates the leading position in the multiplexed frame and is used as the stuffing byte.

When a spare unit is exchanged because of a failure in an in-service unit, the K1 and K2 bytes are used to send and receive the request for exchange. That is, when the K1 and K2 bytes indicate a request for exchange, the MSP processing sections 53A and 53B control the unit exchange processing sections 52A and 52B to make the switch from the solid-line position to the dot-dash line position, thereby switching from the in-service unit to the spare unit.

Figure 3:
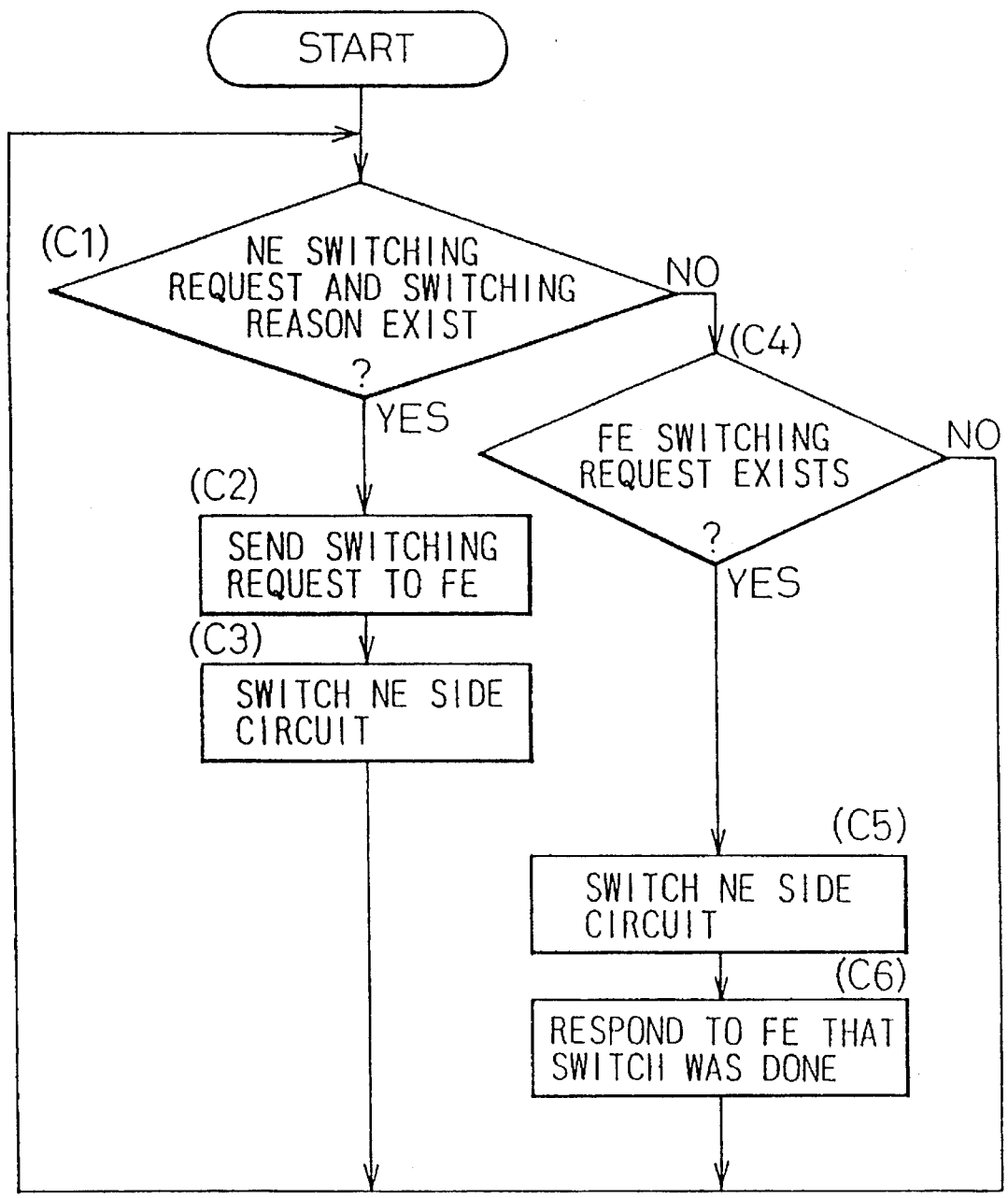
FIG. 3 is an operational flowchart of a prior art MSP processing section.

FIG. 3 is an operational flowchart of a prior art MSP processing section, in which NE and FE are the near-end station and far-end station. For example, in FIG. 1, it is possible to consider the end marked A as the NE and the end marked B as the FE. A judgment is made as to the FE request for exchange and a switching factor, i.e., the reason for switching units between an in-service unit and a spare unit (C1). If there is the factor at the near end, this is transmitted to the far end by means of the K1 and K2 bytes (C2), and then the near end circuit is broken (C3).

If there is no factor described above at a near-end exchange, a judgment is made as to whether or not there is a request for exchange from the far end (C4), and if there is a request the circuit on the near end is exchanged (C5), and a response indicating that the circuit has been exchanged is sent to the far end.

Figure 4:
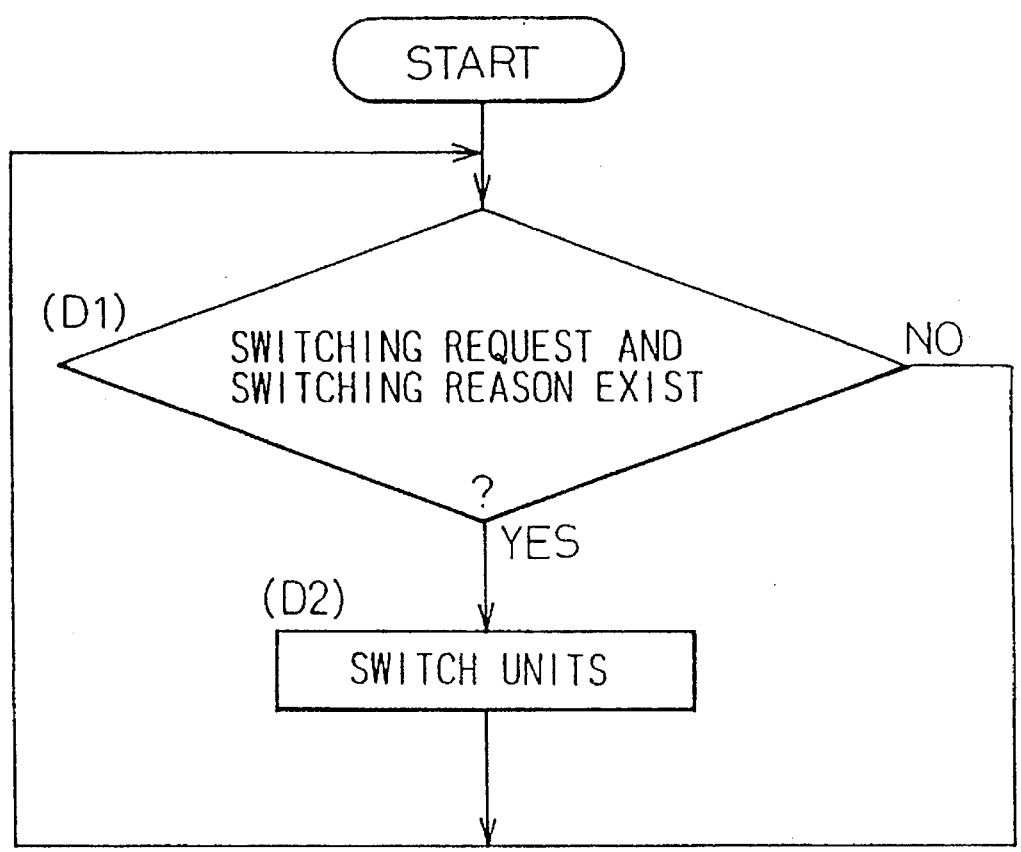
FIG. 4 is an operational flowchart of a prior art unit switching processing section.

FIG. 4 is an operational flowchart of a prior art unit exchange processing section, in which a judgment is made with regard to the unit exchange request and the switching factor (D1), and if such a request and factor exists, the in-service and spare units are exchanged (D2), for example, as shown in FIG. 1.

In STM-1 SDH transmission devices, all parts are configured as units which are installed in a single shelf, enabling an upgrade to STM-4 by exchanging units. FIG. 5 (A) shows an overall view of an STM-1 transmission device, in which 61A-1 and 61B-1 are in-service transmitting/receiving sections (STM1WK), 61A-2 and 61B-2 are spare transmitting/receiving sections (STM1PT), 62-1 and 62-2 are optical transmission paths, 63A and 63B are MSP (multiplex section protection) processing sections (MSP), 64A and 64B are time-slot exchange sections (TSA), 65A and 65B are channel sections (D1CH), and PDH (presynchronous digital hierarchy) indicates asynchronous digital hierarchy. Each of the sections is configured as a unit. The arrows indicate transmission direction.

Figure 5A:
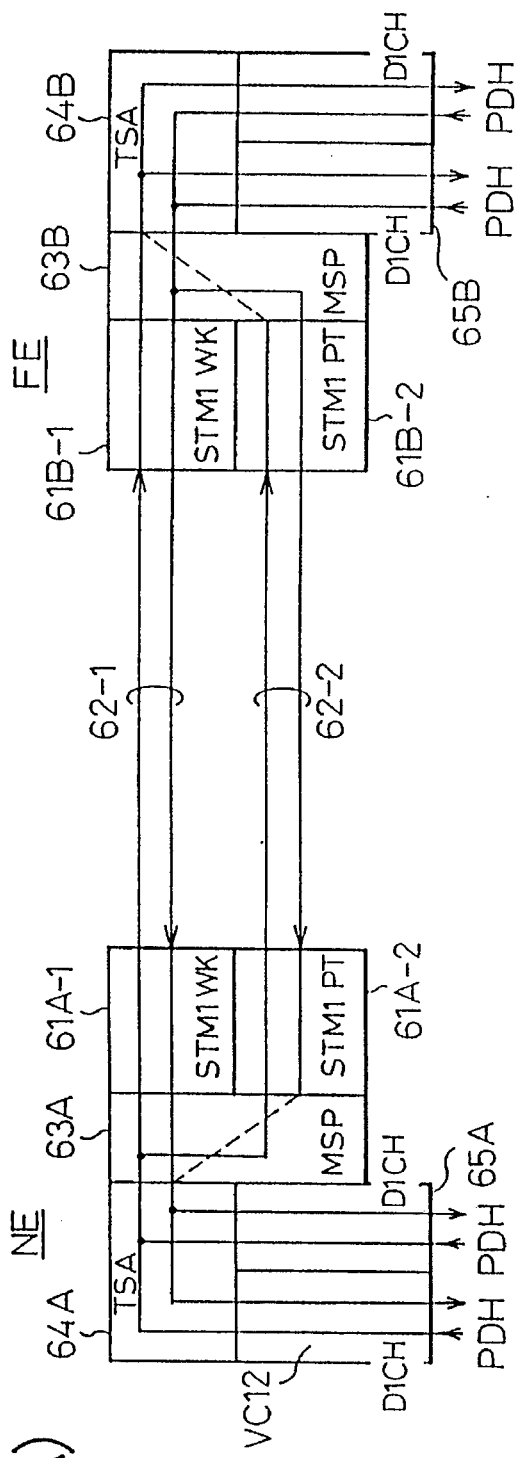
FIG. 5(A) explains the upgrade sequence (1) from STM-1 to STM-4.
Figure 5B:
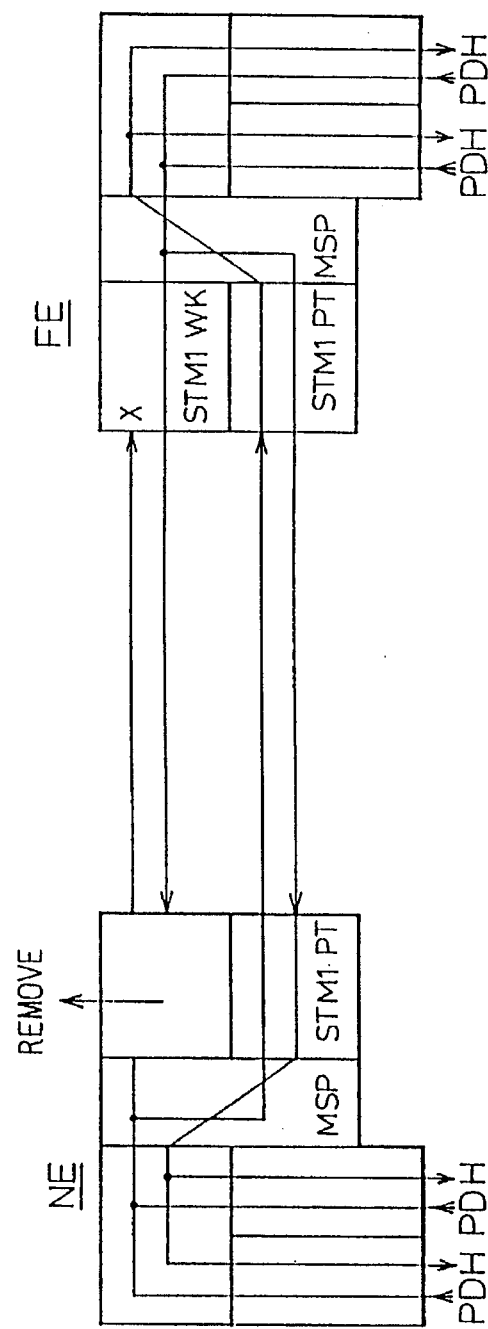
FIG. 5(B) explains the upgrade sequence (2) from STM-1 to STM-4.

The unit exchange performed for the purpose of an upgrade from STM-1 to STM-4 will be explained below, using abbreviations. First, from the condition shown in FIG. 5(A), as shown at FIG. 5(B) the in-service STM1WK transmitting/receiving unit is pulled out at the NE side. By doing this, the MSP of the NE and FE sides makes the judgment that a fault has occurred on the in-service side, and the path is switched from the dotted line in FIG. 5(A) to the solid line path shown at FIG. 5(B), thereby making the switch to the spare transmitting/receiving STM1PT.

Figure 6A:
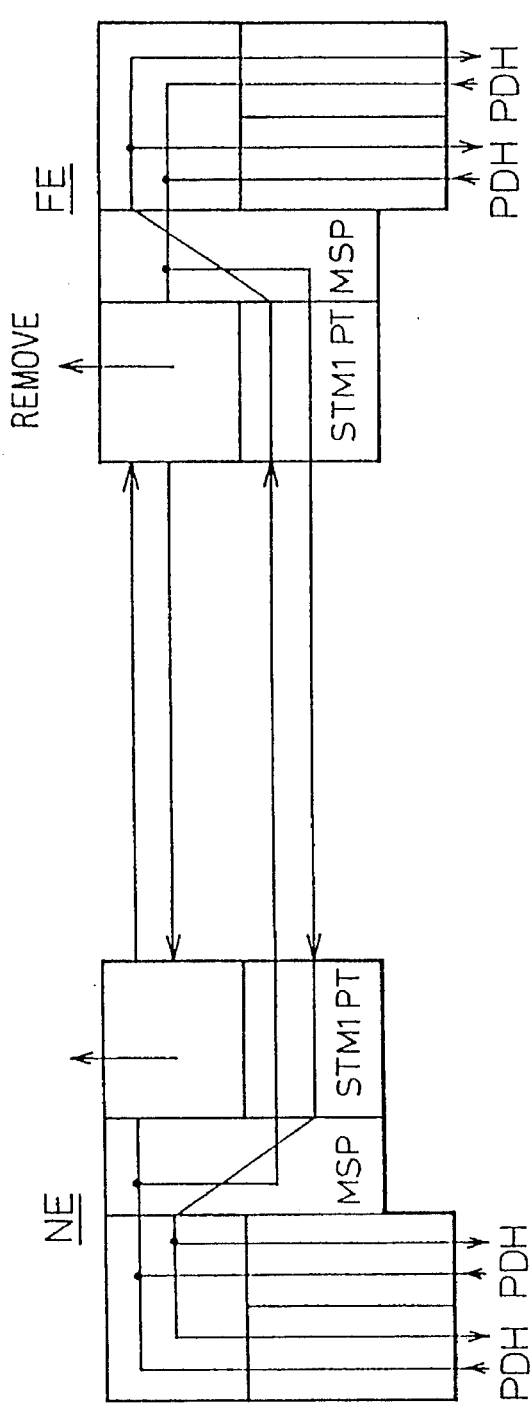
FIG. 6(A) explains the upgrade sequence (3) from STM-1 to STM-4.
Figure 6B:
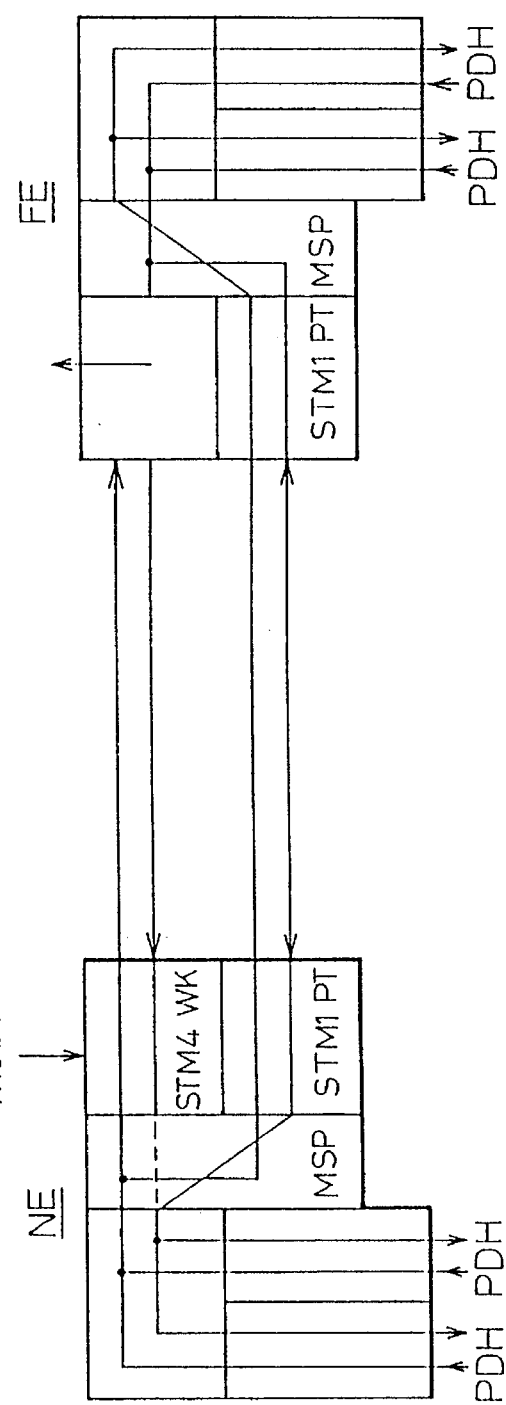
FIG. 6(B) explains the upgrade sequence (4) from STM-1 to STM-4.

Next, as shown in FIG. 6(A), the STM1WK transmitting/receiving unit on the FE side is pulled out. In doing this, because a switch has already been made by the MSP to the spare side, pulling out the FE side STM1WK transmitting/receiving unit does not affect other parts. Next, as shown in FIG. 6(B), an STM-4WK transmitting/receiving unit for STM-4 is inserted into the slot from which the STM1WK transmitting/receiving unit was removed on the NE side.

Figure 7A:
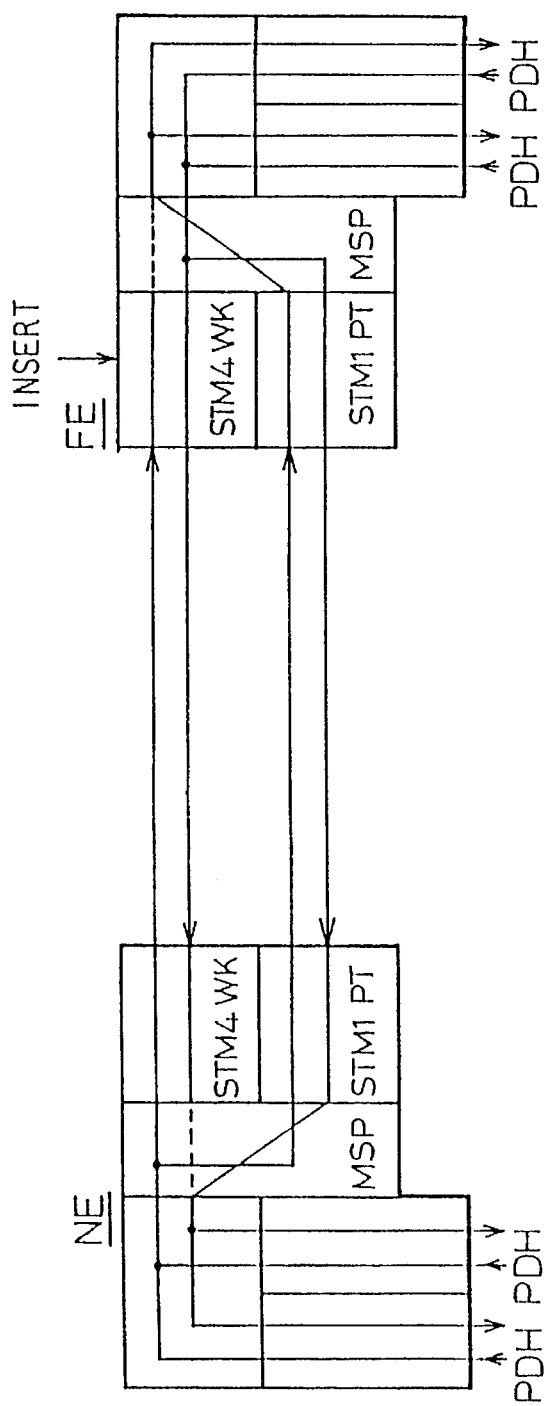
FIG. 7(A) explains the upgrade sequence (5) from STM-1 to STM-4.
Figure 7B:
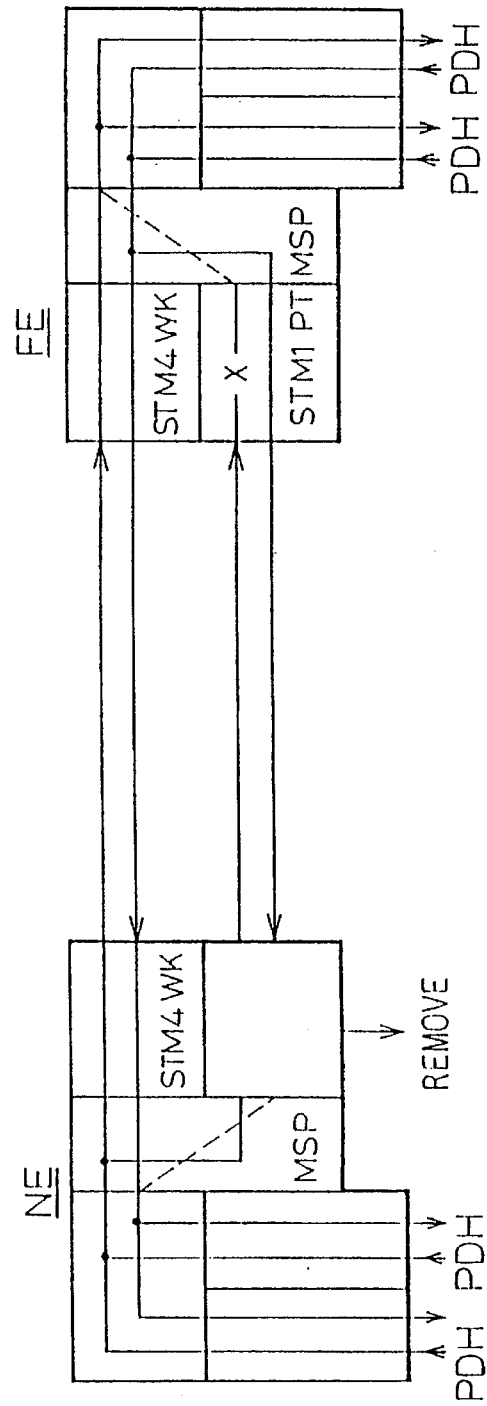
FIG. 7(B) explains the upgrade sequence (6) from STM-1 to STM-4.

Next, as shown in FIG. 7(A), an STM4WK transmitting/receiving unit for STM-4 is inserted into the slot from which the STM1WK transmitting/receiving was removed on the FE side. Then as shown in FIG. 7(B), the STM1PT transmitting/receiving unit for STM-1 is removed from the NE side. By doing this, the NE side and FE side MSPs make the judgment that a fault has occurred on the spare side, and make the switch to the in-service STM4WK transmitting/receiving unit. In this condition, STM-4 transfer at 600 Mbps is possible.

Next, as shown in FIG. 8(A), the STM1PT transmitting/receiving unit is removed from the FE side, and then as shown in FIG. 8(B) an STM4PT transmitting/receiving unit for STM-4 is inserted at the NE side.

Figure 9:
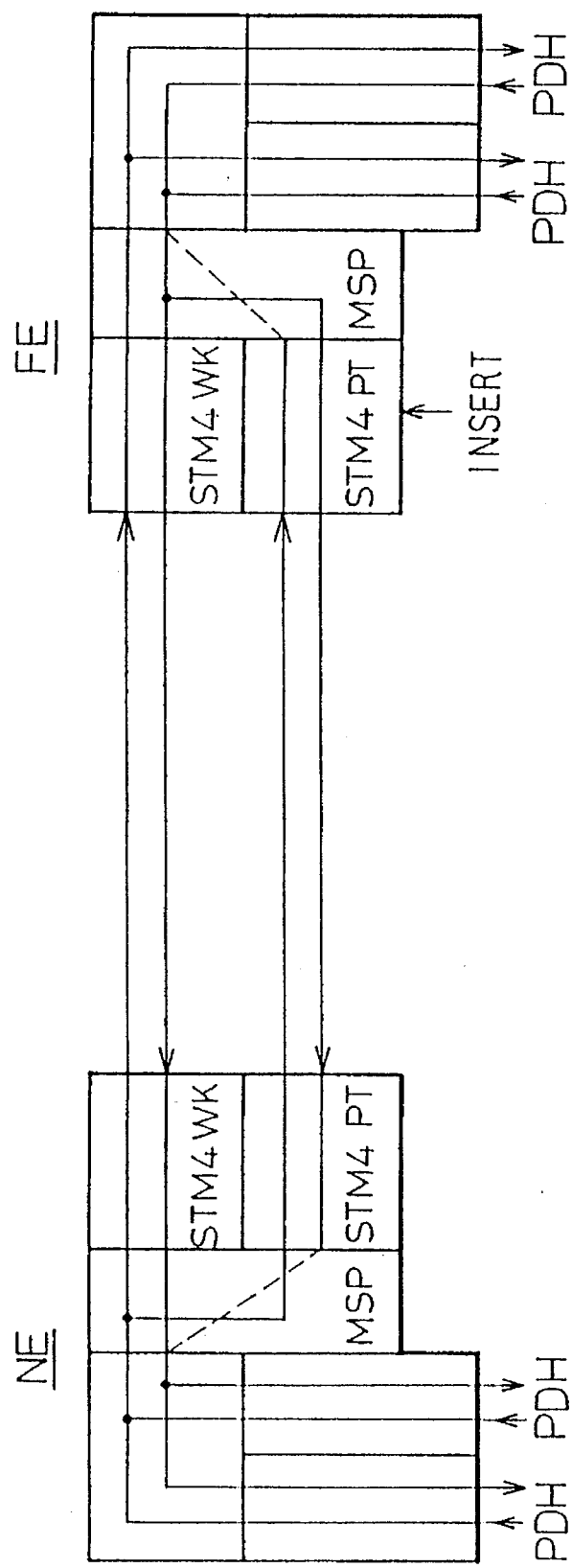
FIG. 9 explains the upgrade sequence (9) from STM-1 to STM-4.

Next, as shown in FIG. 9, an STM4PT transmitting/receiving unit for STM-4 is inserted at the FE side. By doing this, the near end and far end are configured so as to be connected by in-service and transmitting/receiving units STM4WK and STM4PT, and in the processing of making the change from FIG. 5(A) to FIG. 9, an upgrade from STM-1 to STM-4 is made while maintaining the in-service condition.

An STM-16 SDH transmitting/receiving device with a bit rate of 2.4 Gbps is configured with an HS shelf which performs transmission and reception of optical signals at 2.4 Gbps, and up to four tributary shelves which perform conversion to the PDH asynchronous digital hierarchy, the HS shelf and tributary shelves being connected by 600-Mbps electrical signals, with housing at the tributary shelf side done in an interface unit. This interface unit has a redundant configuration, wherein a normal/fault judgment is made and the processing performed to switch to the normal interface unit.

Figure 10A:
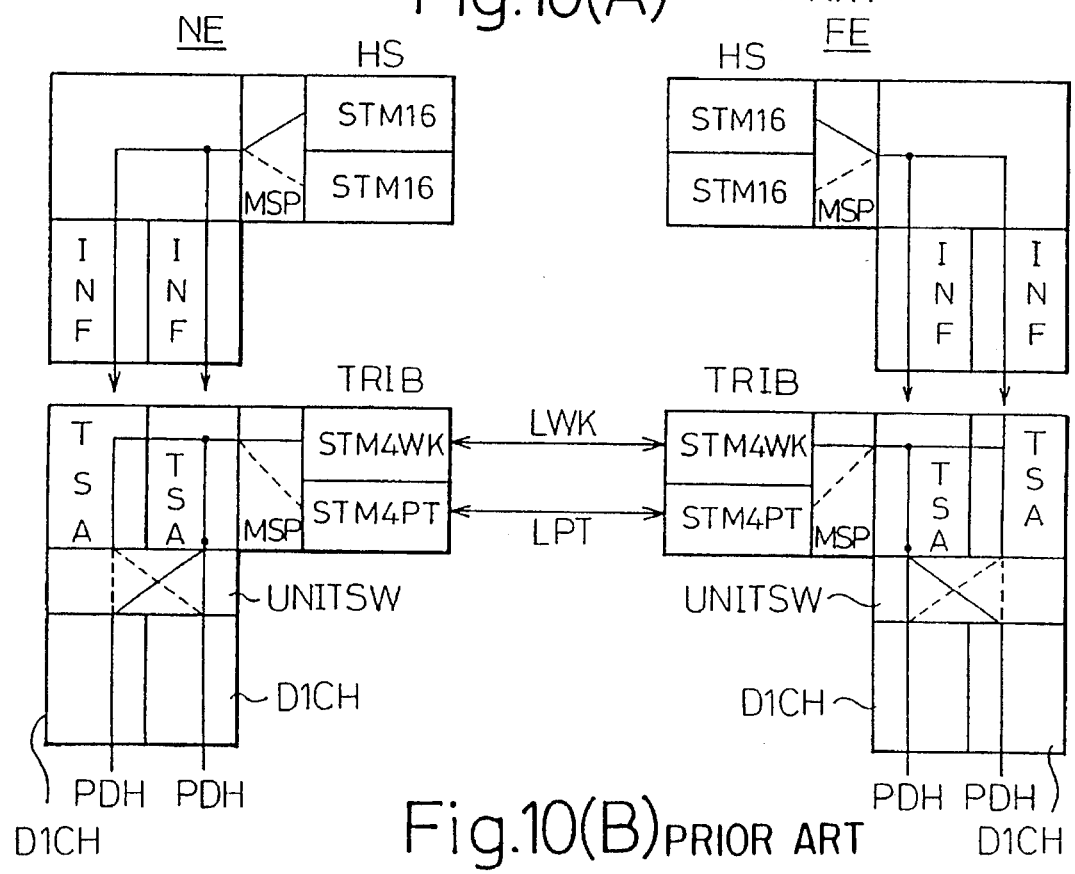
FIG. 10(A) explains the prior art upgrade sequence (1) from STM-4 to STM-16.

When upgrading either the above-described SDH transmission device which was upgraded from STM-1 to STM-4, or an SDH transmission device that was made from the start for STM-4 use (600 Mbps) to be used for high-speed transmission STM-16 (2.4 Gbps), the SDH transmission device for STM-16, as described previously is configured in shelves, such as, for example, as shown in FIG. 10(A), with the NE side and FE side HS shelves consisting of redundant STM16 transmitting/receiving in-service and spare units for STM-16, an MSP processing unit, and an INF interface section unit with a redundant configuration.

The TRIB shelves of the NE side and FE side SDH transmission device for STM-4 include an in-service STM4WK transmitting/receiving unit for STM-4 and a spare STM4PT transmitting/receiving unit for STM-4, a time-slot exchange section TSA unit for redundantly configured cross-connection, a UNITSW unit switching unit, and a channel section D1CH unit, with the NE side and the FE side being connected via the in-service LWK and spare LPT optical transmission paths.

Figure 10B:
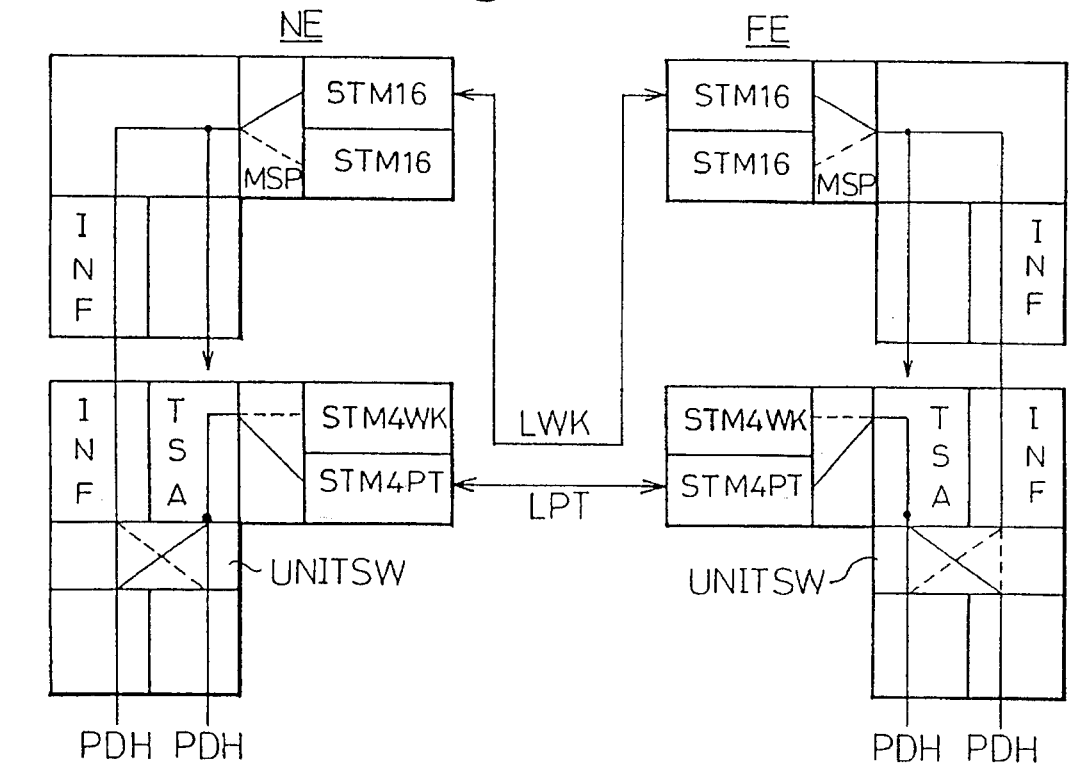
FIG. 10(B) explains the prior art upgrade sequence (2) from STM-4 to STM-16.

As shown in FIG. 10(A), in the case in which the unit switching UNITSW unit and MSP are switched so as to be connected by the solid line path, the in-service optical transmission path LWK is switched from the STM4WK transmitting/receiving section for STM-4 to the STM16 transmitting/receiving section for STM-16, by means of re-inserting connectors, for example, so as to make the connection as shown in FIG. 10(B). When doing this, control by the MSP processing sections of the NE side and FE side makes the switch from the in-service STM4WK to the spare STM4PT transmitting/receiving section, this being the switch from the dotted line to the solid line. Therefor, transmission is continued over the LPT optical transmission path and the circuit is not broken.

Next, one unit of the redundantly configured TSA time-slot exchange sections is exchanged with the INF interface section with respect to the HS shelf. When doing this, the removal of the unit is detected and the redundant unit is switched in so that the circuit is not broken.

Figure 11:
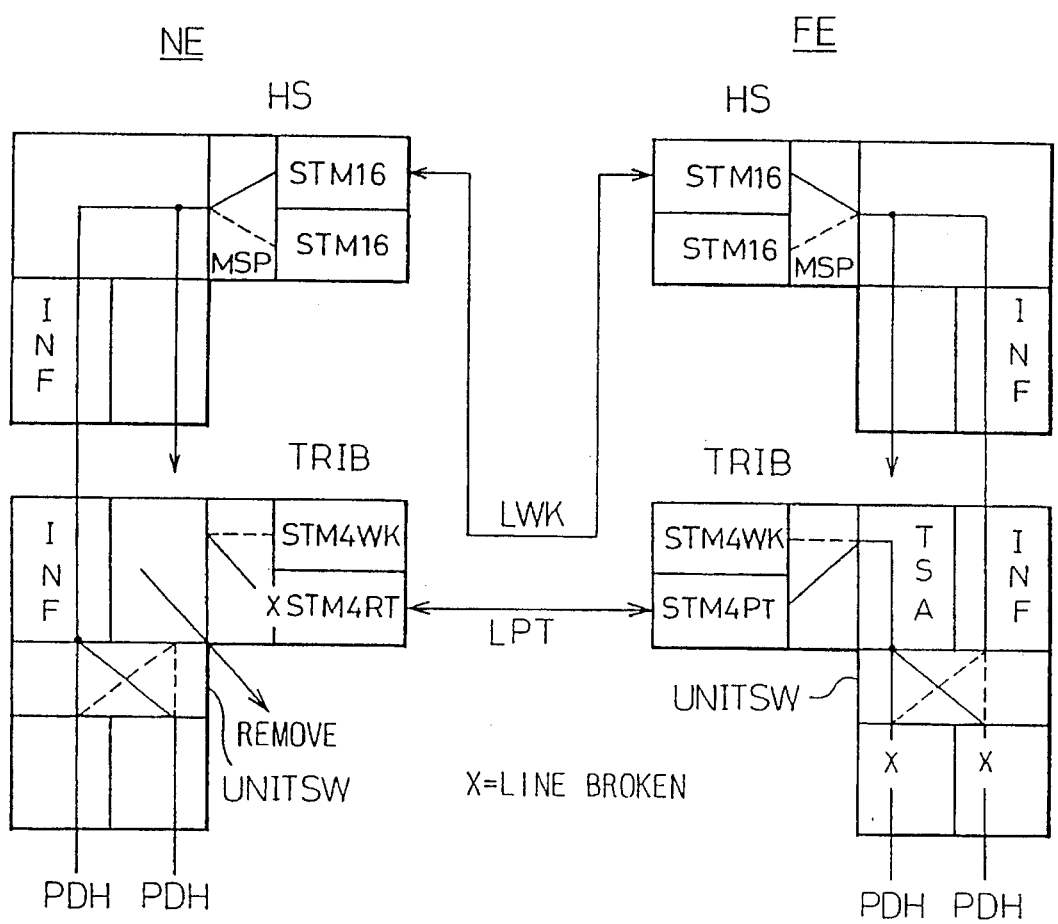
FIG. 11 explains the prior art upgrade sequence (3) from STM-4 to STM-16.

Next as shown in FIG. 11, when TSA time-slot exchange unit remaining at the NE side is removed, a switch is made by the UNITSW unit switching unit to the INF interface unit just inserted, so that the connection is made, via the INF interface unit of the TRIB tributary shelf and the INF interface unit of the HS shelf, between the PDH asynchronous digital hierarchy and the STM16 transmitting/receiving section for STM-16.

When this is done, at the FE side since the TSA time-slot exchange section is not removed, the UNITSW unit switching section is maintained in its previous condition. Therefore, the circuit is broken. Even if the UNITSW unit switching processing section switches from the TSA time-slot exchange section to the INF interface side before the TSA time-slot exchange section is removed from the NE side, because the UNITSW unit switching processing section is maintained in the same condition, the circuit is broken.

When this happens, the maintenance personnel at the NE side and FE side can contact each other to enable simultaneous removal the TSA time-slot switching sections, thereby placing the UNITSW unit switching processing section into operation. However, with this method, there could be a skew in the timing of the operations performed by the maintenance personnel, and it is impossible to achieve switching in the 50 ms required for in-service upgrades.

To achieve the above-noted objects, the synchronous digital hierarchy transmission device and method of exchanging synchronous digital hierarchy transmission device units according to the present invention has a configuration that can be explained as follows, with reference to FIG. 12. After the upgrade from STM-4 to STM-16, this configuration has at least redundantly configured transmitting/receiving sections (STM4W and STM4P) 1-1 and 1-2, the multiplexing protection processing sections (MSP) 2 which switch these 2, the redundantly configured time-slot switching section (TSA) 3 (INF indicating the interface section unit after the switching of units), a unit switching processing section (UNITSW) 4, and a channel section (D1CH) 5, and furthermore in a unitized SDH transmission device, registers (not shown in the drawing) are provided in both the multiplexing protection processing sections 2 and the unit switching processing sections 4 for the purpose of setting unit switching information, and in addition a signal line 6 is provided for transfer of unit switching information from the multiplexing protection processing section 2 to the unit switching processing section 4.

The system of exchanging unitized synchronous digital hierarchy transmission device units for the purpose of upgrading according to the present invention has a configuration consisting of at least the redundantly configured transmitting/receiving sections 1-1 and 1-2, the multiplexing protection processing section 2, the redundantly configured time-slot switching section 3, the unit switching processing section 4, and the channel section 5, wherein each of the multiplexing protection processing section 2 and unit switching processing section 4 are provided with a register for the setting of unit switching information, so that when the above-noted multiplexing protection processing section 2 of the near SDH transmission device and the far SDH transmission device makes a unit switching request, the relevant unit switching information is set into the register of the multiplexing protection processing section 2. In the process of switching the units, in addition to the transmission of a mandatory unit switching request from the SDH transmission device of either the near end or the far end to the other SDH transmission device, by means of this mandatory unit switching request, unit switching information is transmitted from multiplexing protection processing section 2 via the signal line 6 to the unit switching processing section 4.

In the unit switching method for the purpose of upgrading an SDH transmission device having a single-shelf configuration to a high transfer speed SDH transmission device having a multiple-shelf configuration, unit switching is performed after switching the connection of the optical transmission path 7-1 of the in-service low transfer speed SDH transmission device transmitting/receiving section 1-1 to the high transfer speed in-service transmitting/receiving section 11-1.

In the unit switching method for the purpose of upgrading an SDH transmission device having a single-shelf configuration to a high transfer speed SDN transmission device having a multiple-shelf configuration, the unit switching request is made of the multiplexing protection processing section 2 before switching the remaining time-slot switching section 3 unit of the redundant configuration of the low transfer speed SDH transmitting/receiving device for the interface unit section (INF) unit.

The STM-4 SDH transmitting/receiving device has at least an in-service transmitting/receiving section (STM4WK) 1-1, a spare transmitting/receiving section (STM4P) 1-2, a multiplexing protection processing section (MSP) 2, a redundantly configured time-slot switching section (TSA) 3, a unit switching processing section (UNITSW) 4 and a channel section (D1CH), and each of these is configured as a unit. In addition, a register is provided for the multiplexing protection processing section 2 and for the unit switching processing section 3. When a request for unit switching is made by, for example, maintenance personnel, to the multiplexing protection processing section 2, the unit switching information is set into the register of the multiplexing protection processing section 2, and is transferred to the unit switching processing section 3 via the signal line 6. By doing this, the unit switching processing section 3 performs unit switching. Also, because of the unit switching to make the upgrade, the time-slot switching section 3 serves as the interface section (INF). In the Figure, references 7-1 and 7-2 are optical transmission paths, 11-1 and 11-2 are high transfer speed in-service and spare transmitting/receiving sections (STM16W, STM16P), 12 is a multiplexing protection processing section (MSP), and 13 is a redundantly configured interface section (INF).

In the unit switching method for the purpose of making an upgrade, in the case in which units are switched based on unit exchanges, a unit switching request is made with respect to the multiplexing protection processing section 2 of the near-end SDH transmission device and the far-end SDH transmission device beforehand. By means of this unit switching request, the unit switching information is set into the registers of the near-end SDH transmission device and the far-end SDH transmission device. In the process of performing unit exchange, if unit switching is necessary, a mandatory unit switching request is made of the multiplexing protection processing section 2 of one of the SDH transmission devices, for example of the multiplexing protection processing section of the SDH transmission device at which the unit exchange is performed first. This mandatory unit switching request is transferred to the other SDH transmission device's multiplexing protection processing section 2. Then the multiplexing protection processing section 2 performs operations including cutting the circuit, and also transfer of the unit switching information which was set in the register to the unit switching processing section 4 via the signal line 6. The unit switching processing section 4 sets the thus transferred unit switching information into a register, and performs unit switching.

After the change of the connection of the optical transmission path 7-1 between the in-service transmitting/receiving sections 1-1 to the in-service high transfer speed transmitting/receiving sections, the exchange of units begins. By doing this, because the spare transmitting/receiving section 11-2 remains, it is possible to send the unit switching request from the near-end SDH transmission device to the far-end SDH transmission device. When the unit exchange is performed, because a switch is made from the spare side to the in-service side, it is possible to perform transfer via the in-service high transfer speed transmitting/receiving section 11-1 and the optical transmission path 7-1, without a break in the circuit.

Before exchanging the unit in the time-slot switching section 3 of the remaining redundant low transfer speed SDH transmission device for the interface section (INF), a unit switching request is send to the multiplexing protection processing section 2, by which the unit switching processing section 4 switches to the interface section (INF) which was just exchanged, so that even if the remaining time-slot exchange section is removed there is no effect on other parts, thereby enabling upgrading by exchanging units without breaking the circuit.

Figure 13:
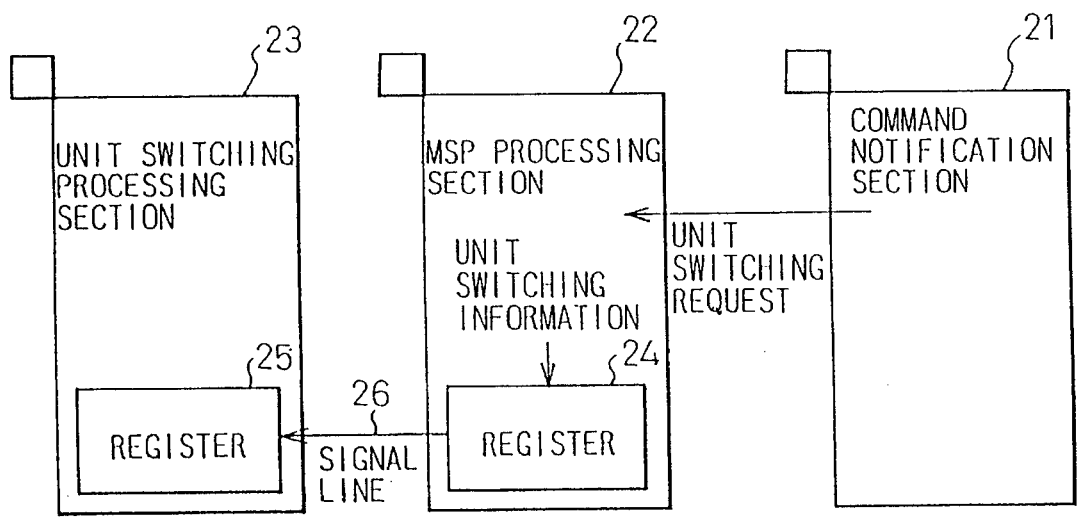
FIG. 13 explains the main parts of an embodiment of the present invention.

FIG. 13 explains the main part of an embodiment of the present invention, in which 21 is a command notification section, 22 is an MSP processing section, 23 is a unit switching processing section, 24 and 25 are registers, and 26 is a signal line. The command notification section 21 has a function of providing notification of various parts of commands which are input from a console (not shown in the drawing) which is operated, for example, by maintenance personnel.

Figure 12:
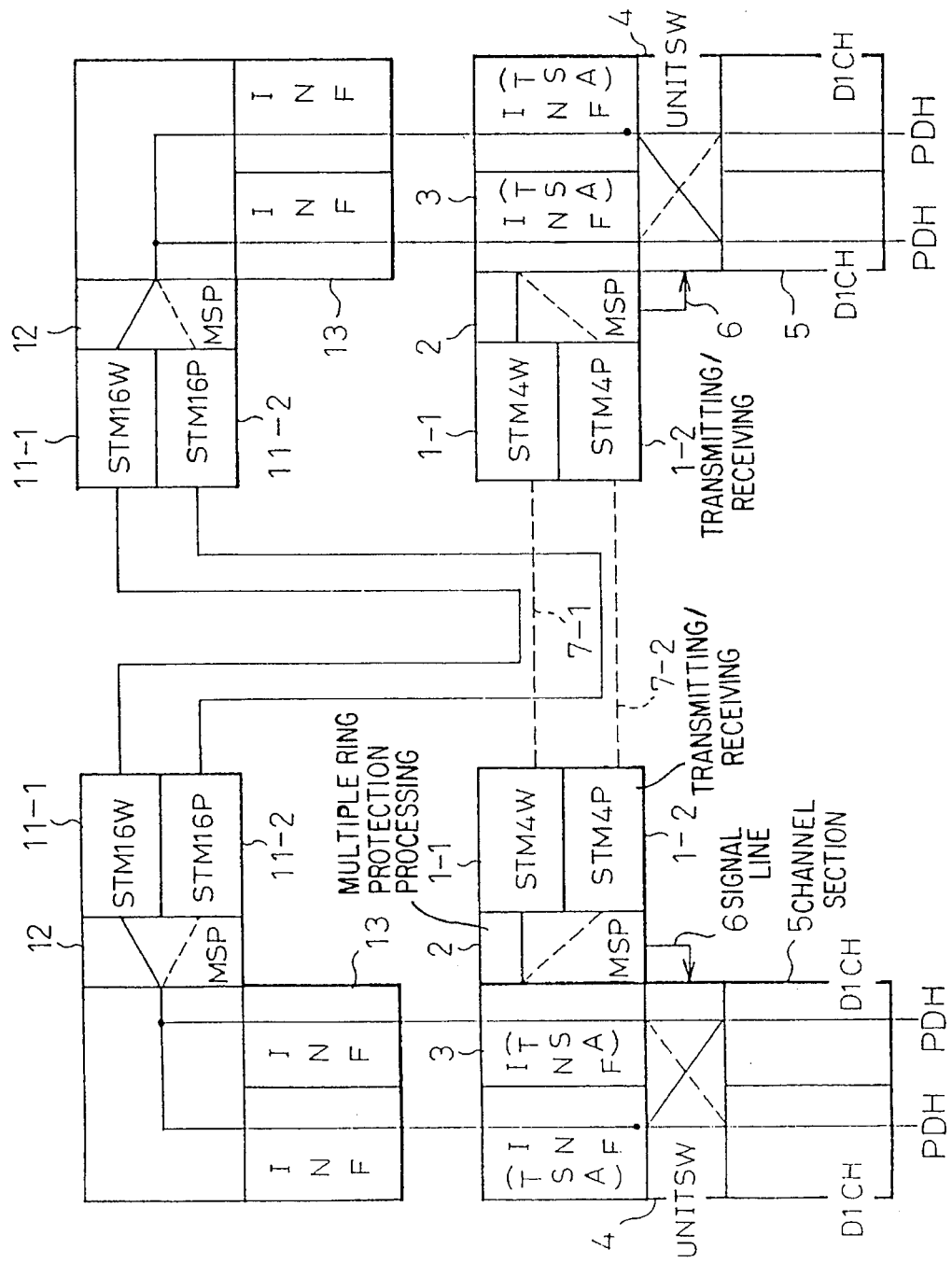
FIG. 12 shows the principle of the present invention.

The STM-4 SDH transmission device has, for example as shown in FIG. 12, an in-service STM-4 transmitting/receiving section (STM4WK) 1-1, a spare transmitting/receiving section (STM4P) 1-2, a multiplexing protection processing section (MSP) 2, a redundantly configured time-slot exchange section 3, a unit switching processing section 4, and a channel section 5, each of which are configured as units, a signal line 6 being provided between the multiplexing protection processing section 2 and the unit switching processing section 4. Registers are provided in the multiplexing protection processing section 2 and unit switching processing section 4 for the purpose of setting unit switching information. These registers are shown as 24 and 25 in FIG. 13. The multiplexing protection processing section 2 of FIG. 12 corresponds to the MSP processing section 22 of FIG. 13, and the unit switching processing section 4 of FIG. 12 corresponds to the unit switching processing section 23 of FIG. 13.

Figure 14:
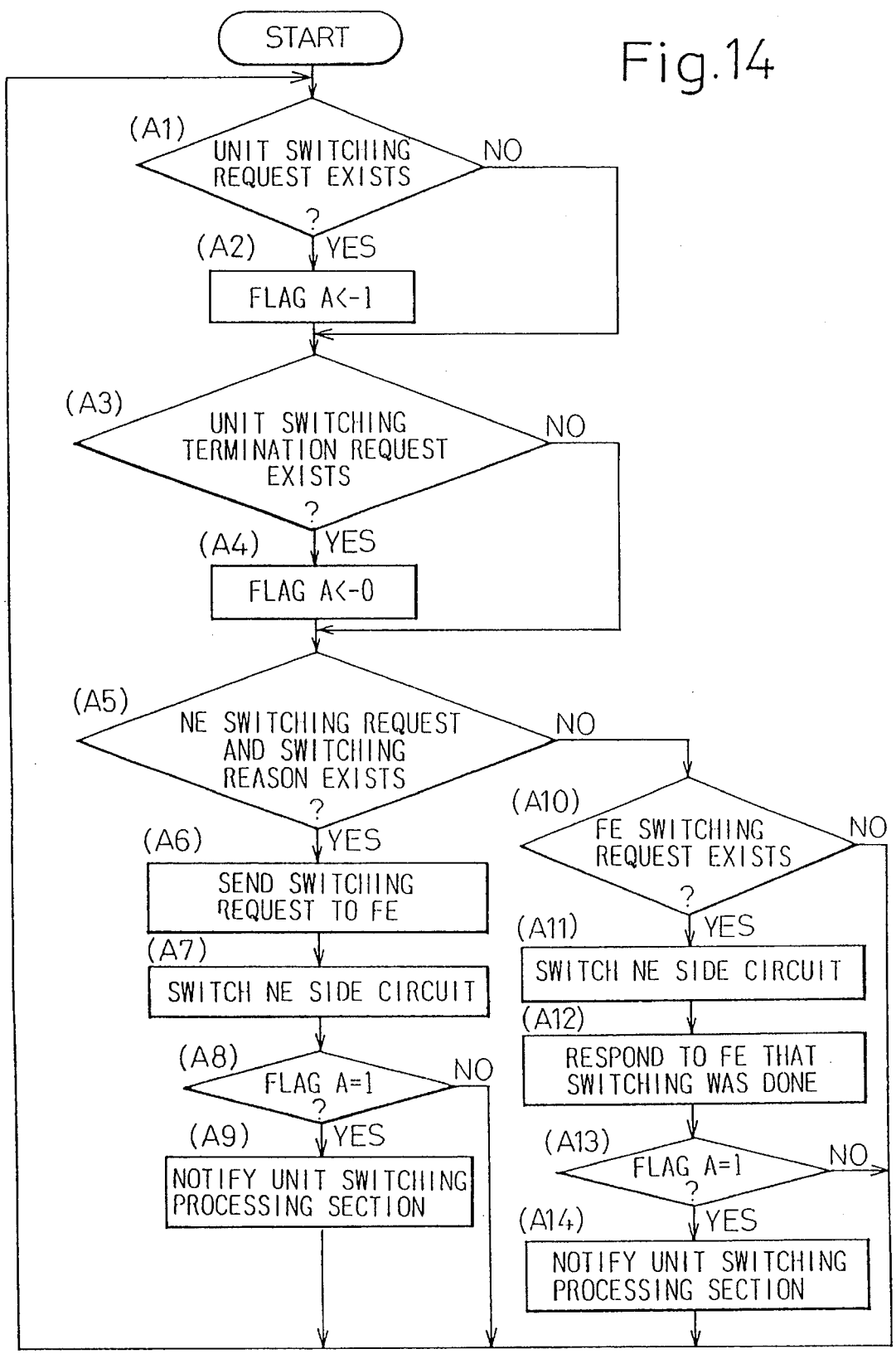
FIG. 14 is an operational flowchart of the MSP processing section of an embodiment of the present invention.

FIG. 14 is an operational flowchart of the MSP processing section of an embodiment of the present invention, which makes a determination as to the existence of a unit switching request (A1). This unit switching request is made with respect to the MSP processing section at the NE (near end) (the SDH transmission device of its own station), and is also transferred to the far end (the other station's SDH transmission device) via the in-service optical transmission path. If there is a unit switching request, flag A is set to "1" (A2).

That is, from the command notification section 21 the unit switching request causes unit switching information with A="1" to be set into register 24. A judgment is made as to the existence of a request for termination of unit switching from the command notification section 21 (A3) and if a unit switching termination request exists, flag A is set to "0".

Next, a judgment is made with regard to the existence of a switching request and the factor thereof of the NE (near-end) (its own SDH transmission device) (A5). That is, a judgment is made with regard to a mandatory switching request or fault detection in the unit exchange process. If such a request or fault exists, a switching request is sent to the FE (far end) (other SDH transmission device) (A6) and the NE circuit is switched. That is, the in-service unit is switched with the spare unit (A7). Then flag A is tested to see whether or not it is "1", and if it is "1" notification is sent to the unit switching processing section 23. That is, when a unit switching request is applied to the MSP processing section 22 from the command notification section 21, flag A is set to "1" in register 24, and when a mandatory switching request occurs in the process of exchanging units, a mandatory switching request is sent to the far-end SDH transmission device, unit switching information being transferred via the signal line 26 to the unit switching processing section 23 and set into register 25, and the unit switching processing section 23 executes the unit switching processing.

In the case in which a switching request is received from the other (far-end) SDH transmission device, since at step (A10) the existence of an FE switching request will be detected, the NE side circuit is switched. That is, switching is performed of the in-service unit and spare unit (A11), and a response is made to the FE side, which made the switching request, to the effect that the switching operation has been performed (A12). Then a judgment as to whether flag A is "1" is made (A13), and if it is "1", since this is the case in which the unit switching has been performed beforehand, unit switching information is sent to the unit switching processing section 23 via the signal line (A14).

Figure 15:
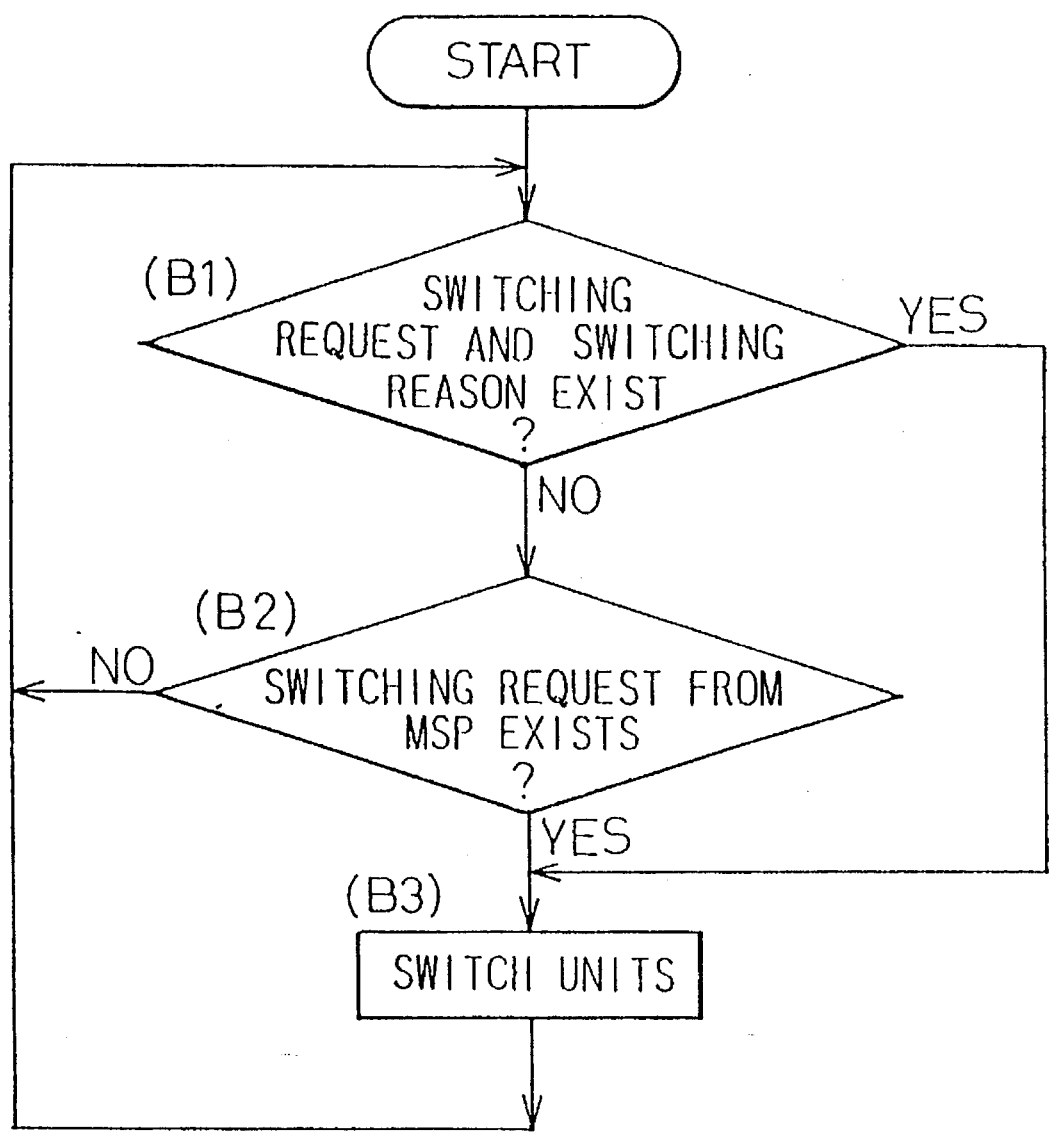
FIG. 15 is an operational flowchart of the unit switching processing section of an embodiment of the present invention.

FIG. 15 is an operational flowchart of a unit switching processing section of an embodiment of the present invention, in which a determination is made as to the existence of a switching request and a switching factor, i. e., the reason for switching units between an in-service unit and a spare unit, because of, for example, inserting or removing a unit (B1), and if none exists, a determination is made as to whether or not there is a switching request from the MSP (B2). In the case in which there is a switching request and the switching factor, in the case in which there is a switching request, unit switching is performed (B3). That is, in the case in which a unit from a redundantly configured time-slot exchange section is removed, the switching factor exists, and unit switching is done. In the case in which unit switching information is transferred from the MSP processing section 22 via the signal line 26 and set into the register 25, a switching request from the MSP exists and unit switching is performed.

Figure 16A:
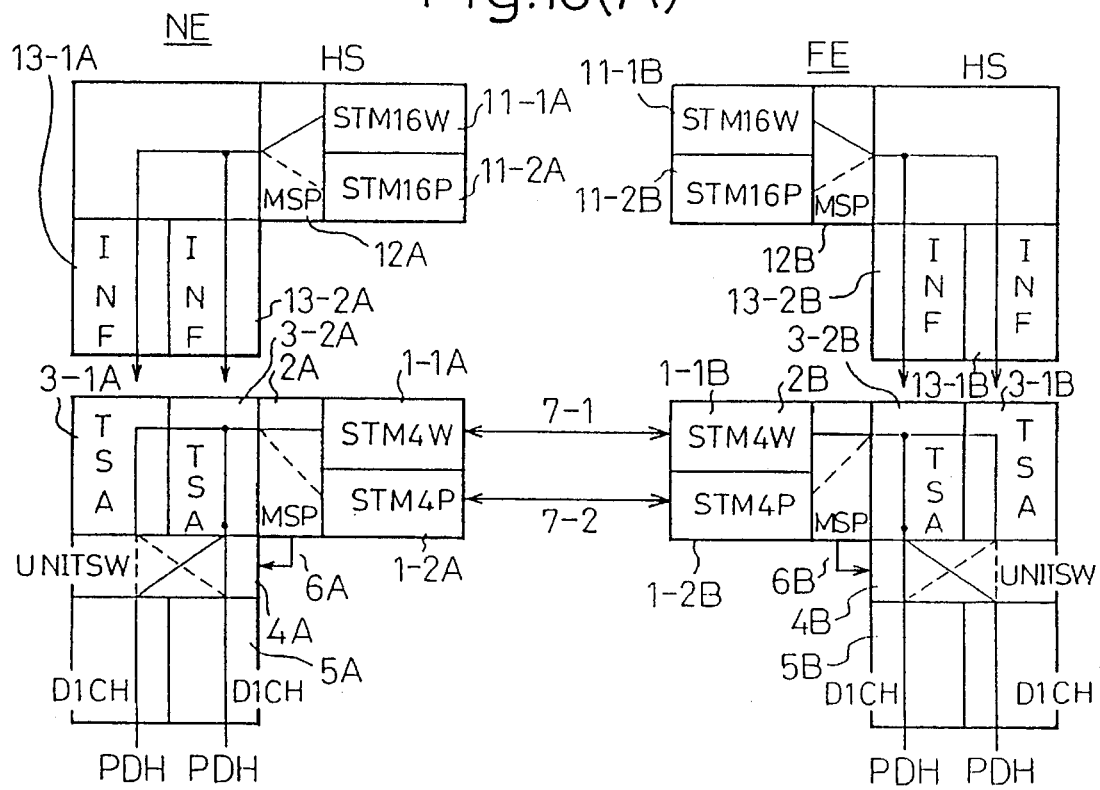
FIG. 16(A) explains the upgrade sequence (1) according to the method of exchanging units of an embodiment of the present invention.
Figure 16B:
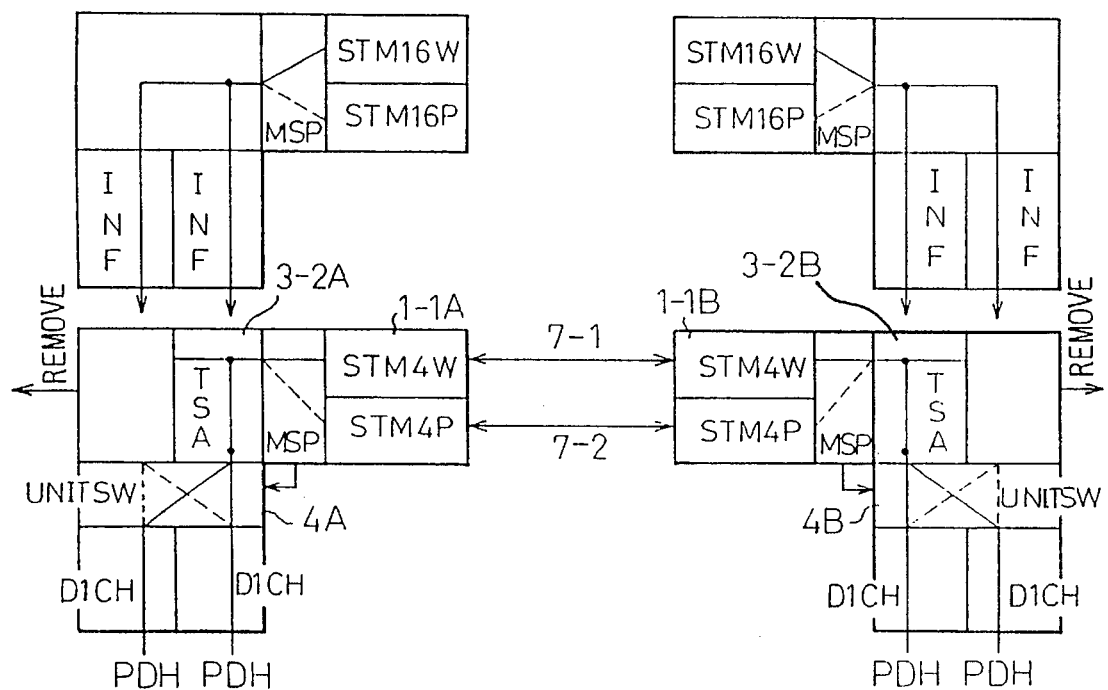
FIG. 16(B) explains the upgrade sequence (2) according to the method of exchanging units of an embodiment of the present invention.

What follows is an explanation of the method of exchanging units for the purpose of making an in-service upgrade from STM-4 to STM-16. In FIG. 16 (A), the STM-4 SDH transmission devices at the NE and FE sides are connected by means of the optical transmission paths 7-1 and 7-2. The NE side includes an in-service transmitting/receiving section (STM4W) 1-1A, spare transmitting/receiving section (STMP) 1-2A, an MSP processing section (MSP) 2A, redundantly configured time-slot exchange sections (TSA) 3-1A and 3-2A, unit switching processing section (UNITSW) 4A, and channel section (D1CH) 5A, each of these being configured as a unit. The FE side is indicated by a suffixed B. There are registers (not shown in the drawing) provided in the MSP processing sections 2A and 2B, and in the unit switching processing sections 4A and 4B, and further signal lines 6A and 6B are provided between the MSP processing sections 2A, 2B and the unit switching processing sections 4A, 4B.

On the NE side HS shelf for the purpose of configuring an STM-16 SDH transmission device, there are installed an in-service transmitting/receiving section (STM16W) 11-1A, a spare transmitting/receiving section (STM16P) 11-2A, an MSP processing section (MSP) 12A, and redundantly configured interface sections (INF) 13-1A and 13-2A. The FE side HS shelf is the same, with parts indicated by the suffix B.

Next, as shown in FIG. 16 (B), the NE side time-slot exchange section (TSA) 3-1A is removed, and the FE side time-slot exchange section (TSA) 3-1B is removed. In this case, the unit switching processing sections 4A and 4B are automatically switched to the time-slot exchange sections 3-2A and 3-2B when the time-slot exchange sections 3-1A and 3-1B are removed (refer to step (B1) of FIG. 15). Even in this condition, optical signals are transferred in STM-4 format via the optical transmission path 7-1 by the in-service transmitting/receiving sections (STM4W) 1-1A and 1-1B. The circuit is therefore not broken.

Next, as shown in FIG. 17 (A), interface section units (INF) 33-1A and 33-1B are in inserted into the slots from which the time-slot exchange section 3-1A and 3-1B were removed on the NE and FE sides. By doing this, a connection is made between the interface sections 13-1A an 13-1B of the HS shelf. When an upgrade is made to 2.4-Gbps STM-16, electrical signals at 600 Mbps are connected between these interface sections (INF).

Next, as shown in FIG. 17(B) the optical transmission path 7-1 connection is changed. That is, the optical transmission path 7-1 connection is changed from the NE side in-service STM-4 transmitting/receiving section (STM4W) 1-1A to the in-service STM-16 transmitting/receiving section (STM16W) 11-1A, and the optical transmission path 7-1 connection is changed from the FE side STM-4 in-service transmitting/receiving section (STM4W) 1-1B to the in-service STM-16 transmitting/receiving section (STM16W) 11-1B. When doing this, it is necessary to first change the connection of the in-service optical transmission path.

By making this connection change, because the in-service circuit is broken, the MSP processing sections 2A and 2B assume that there is the prescribed factor (refer to step (A5) in FIG. 14) and switch the connection from the in-service transmitting/receiving sections 1-1A and 1-1B to the spare transmitting/receiving sections 1-2A and 1-2B. Therefore, transfer of optical signals in the STM-4 format is continued via the spare optical transmission path 7-2. That is, the circuit is not broken.

First, the unit switching request is made of the MSP processing sections (MSP) 2A and 2B. For example, when a unit switching request is made of the NE side MSP processing sections 2A and 2B, unit switching information is set into the registers (refer to register 24 of the MSP processing section 22 in FIG. 13) of MSP processing sections 2A and 2B (in FIG. 14 flag A is indicated as "1" in steps (A1) and (A2)).

Next, as shown in FIG. 18 (A), a mandatory switching request is made of MSP processing section 2A. By means of this mandatory switching request, the MSP processing section 2A, as shown in FIG. 18 (B), transfers a mandatory switching request to the FE side MSP processing section by means of, for example, the K1 and K2 bytes (refer to the section overhead in FIG. 2). Then, because there is unit switching information set in the register (refer to register 24 in FIG. 13), the MSP processing sections 2A and 2B transfer unit switching information via the signal lines 6A and 6B to the unit switching processing sections 4A and 4B (refer to steps (A8), (A9), (A13), and (A14) in FIG. 14).

Therefore, the unit switching processing sections (UNITSW) 4A and 4B make the switch from the time-slot exchange sections (TSA) 3-2A and 3-2B to the interface sections (INF) 33-1A and 33-1B. In this case, the unit switching processing requires an amount of time that is equivalent to the sum of the switching processing time at the MSP processing section 2A and the time required for notification of the unit switching processing sections 4A and 4B, and because in this case the difference in timing between the switching of units at the near and far ends is within the time required for the transfer of the mandatory switching request, it is possible to switch units at the near and far ends almost simultaneously, so that the circuit is not broken.

By performing unit switching in this manner, at the NE side, connection is made between the channel section 5A, the interface section 33-1A, the interface section 13-1A, the MSP processing section 12A and the in-service transmitting/ receiving section (STM16W) 11-1A, and at the FE side, connection is made between the channel section 5B, the interface section 33-1B, the interface section 13-1B, the MSP processing section 12B and the in-service transmitting/ receiving section (STM16W) 11-1B, with an optical signal being transferred via the optical transmission path 7-1.

Next, the time-slot exchange sections 3-2A and 3-2B are removed. When this is done, because the unit switching processing sections 4A and 4B make a connection between the channel sections 5A and 5B and the interface sections 33-1A and 33-1B, there is no effect from removing the time-slot exchange sections 32A and 3-2B.

Figure 19:
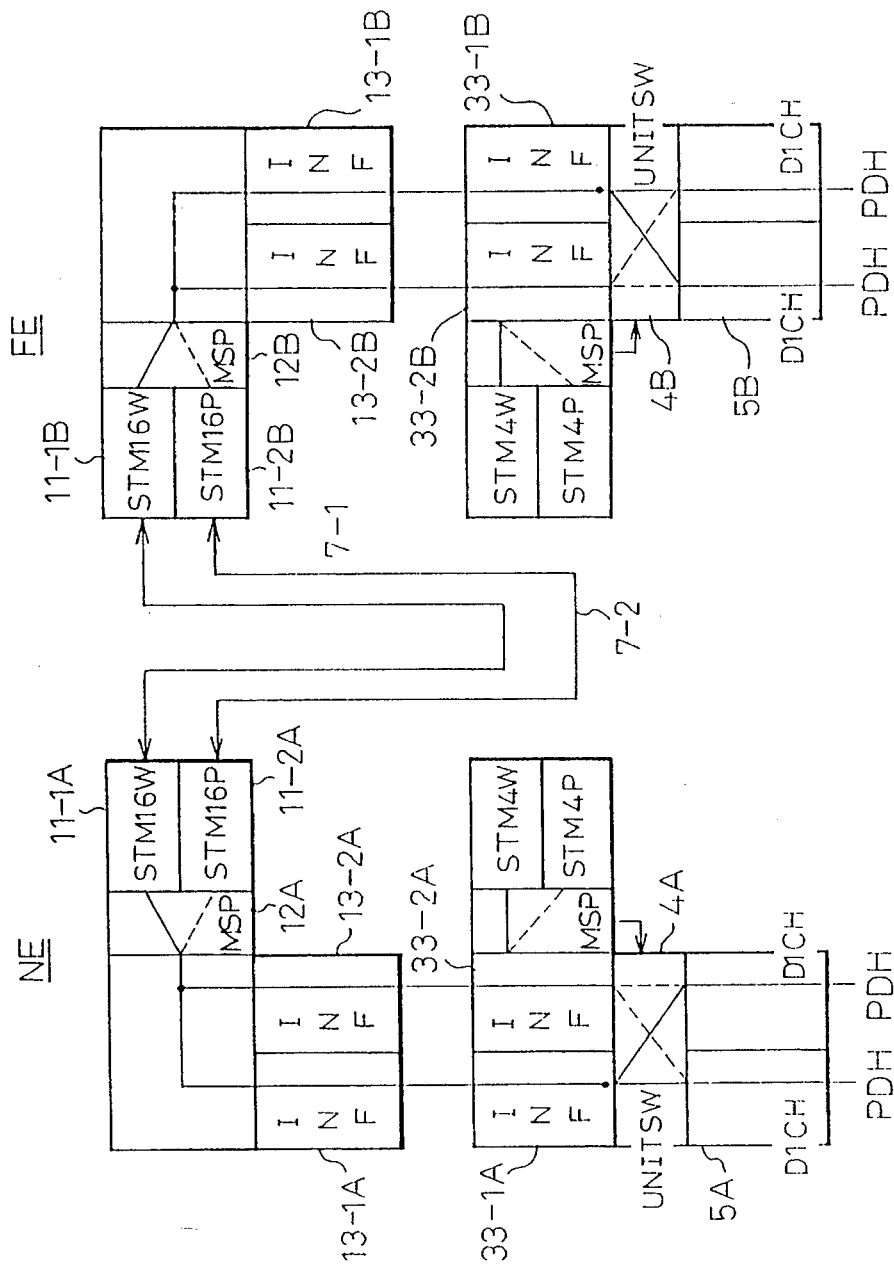
FIG. 19 explains the upgrade sequence (7) according to the method of exchanging units of an embodiment of the present invention.

Next, as shown in FIG. 19, the interface section units (INF) 33-2A and 33-2B are removed, and the optical transmission path 7-2 connection is changed from the spare transmitting/receiving sections (STM4P) 1-2A and 1-2B to the HS shelf-side spare transmitting/receiving sections (STM16P) 11-2A and 11-2B. A switching termination request is made with respect to the MSP processing sections 2A and 2B, and the register into which the unit switching information had been set is cleared.

By means of the above-described method of unit exchange, it is possible to perform an upgrade from STM-4 (600 Mbps) to a multiple-shelf configuration STM-16 (2.4 Gbps) while maintaining the in-service condition. It is also possible to exchange units while maintaining the in-service condition to achieve an upgrade from a single-shelf low transfer speed SDH transmission device to a multiple-shelf high transfer speed SDH transmission device.

As described above, by providing a register, into which is set unit switching information, in the multiplexing protection processing section 2 and in the unit switching processing section 4, and furthermore by providing a signal line 6 between the multiplexing protection processing section 2 and the unit switching processing section 4, the present invention makes it possible to perform switching of units at the near-end SDH transmission device and the far-end SDH transmission device simultaneously when exchanging units. That is, it provides a configuration which enables easy upgrading while maintaining the in-service condition.

Furthermore, in performing unit exchanges for the purpose of performing an in-service upgrade from a low transfer speed SDH transmission device to a high transfer speed SDH transmission device, by placing a unit switching request with respect to the multiplexing protection processing section 2, setting unit switching information into a register, and making a mandatory switching request in the unit exchange process, the unit switching information is transferred to the unit switching processing section 4 via the signal line 6, enabling simultaneous unit switching of both the near-end and far-end SDH transmission devices. Therefore, the present invention offers the advantage of enabling the exchange of units without breaking the circuit.

What is claimed is:

1. A method of exchanging units for the purpose of upgrading an SDH transmission device, said SDH transmission device including:

a redundantly configured transmitting/receiving section including an in-service transmitting/receiving unit and a spare transmitting/receiving unit for respective connection to at least one transmission line;

a unit switching processing section for selectively connecting one of said in-service and said spare transmitting/receiving units for outputting signals to and for receiving signals from said at least one transmission line;

a redundantly configured time-slot exchange section connected to said unit switching processing section;

a multiplexing protection processing section for detecting switching information received from said at least one transmission line for controlling said unit switching processing section to selectively connect one of said transmitting/receiving units to said at least one transmission line;

a channel section connecting to said redundantly configured time-slot exchange section for outputting of received signals and inputting of signals to be transmitted, said sections being configured as units;

a first register in said multiplexing protection processing section for storing unit switching information; and a second register in said unit switching processing section for storing unit switching information;

a signal line for transferring said switching information from said first register to said second register, said method comprising the steps of:

requesting unit switching of the near-end and far-end SDH transmission devices to the multiplexing protection processing section;

setting said unit switching information by means of this unit switching request into said multiplexing protection processing section; and performing unit exchange by which either the near-end SDH transmission device or the far-end SDH transmission device sends a mandatory switching request to the other side, said mandatory switching request causing said unit switching information to be transferred from said multiplexing protection processing section to said unit switching processing section, and the units are then exchanged.

2. A method of exchanging units according to claim 1, wherein a single-shelf low transfer speed SDH transmission device is upgraded to a multiple-shelf high transfer speed SDH transmission device, and exchange of units is performed after changing the connection of a transmission path between the near-end and far-end low transfer speed SDH transmission devices to a connection between the near-end far-end high transfer speed SDH transmission devices.

3. A method of exchanging units according to claim 1, wherein a low transfer speed single-shelf SDH transmission device is upgraded to a multiple-shelf high transfer speed SDH transmission device, and a unit switching request is made to said multiplexing protection processing section before exchanging a remaining time-slot exchange section unit of the low transfer speed SDH transmission device with an interface section unit for connecting to said multiple shelf high transfer speed SDH transmission device.

4. An SDH transmitting and receiving device, comprising:
- a redundantly configured transmitting/receiving section including an in-service transmitting/receiving unit and a spare transmitting/receiving unit for respective connection to at least one transmission line;
- a unit switching processing section for selectively connecting one of said in-service and said spare transmitting/receiving units for outputting signals to and for receiving signals from said at least one transmission line;
- a redundantly configured time-slot exchange section connected to said unit switching processing section;
- a multiplexing protection processing section for detecting switching information received from said at least one transmission line for controlling said unit switching processing section to selectively connect one of said transmitting/receiving units to said at least one transmission line;
- a channel section connecting to said redundantly configured time-slot exchange section for outputting of received signals and inputting of signals to be transmitted, said sections being configured as units;
- a first register in said multiplexing protection processing section for storing unit switching information; and
- a second register in said unit switching processing section for storing unit switching information;
- a signal line for transferring said switching information from said first register to said second register.

* * * * *